United States Patent
Balasubramanian et al.

(10) Patent No.: US 11,221,612 B2
(45) Date of Patent: Jan. 11, 2022

(54) SYSTEM AND METHOD OF COMMUNICATING DATA OVER HIGH AVAILABILITY INDUSTRIAL CONTROL SYSTEMS

(71) Applicant: Rockwell Automation Technologies, Inc., Mayfield Heights, OH (US)

(72) Inventors: Sivaram Balasubramanian, Solon, OH (US); Kendal R. Harris, Mayfield Heights, OH (US); Mark A. Flood, Mayfield Heights, OH (US); Kyle E. Neet, Mayfield Heights, OH (US); Scott A. Pierce, Mayfield Heights, OH (US); Anthony G. Gibart, Milwaukee, WI (US); Raymond R. Husted, Mayfield Heights, OH (US); David M. Fort, Mayfield Heights, OH (US); Chandresh R. Chaudhari, Mayfield Heights, OH (US); Jonathan D. Bradford, Mayfield Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 16/277,285

(22) Filed: Feb. 15, 2019

(65) Prior Publication Data
US 2020/0033840 A1    Jan. 30, 2020

Related U.S. Application Data

(60) Provisional application No. 62/703,986, filed on Jul. 27, 2018.

(51) Int. Cl.
*G06F 11/00* (2006.01)
*G05B 19/418* (2006.01)
*H04L 12/939* (2013.01)

(52) U.S. Cl.
CPC ... *G05B 19/4186* (2013.01); *G05B 19/41855* (2013.01); *H04L 49/552* (2013.01)

(58) Field of Classification Search
CPC .............. G06F 11/142; G06F 11/1423; G06F 11/1425; G06F 11/1428; G06F 11/20;
(Continued)

(56) References Cited

U.S. PATENT DOCUMENTS

| 6,549,034 B1 | 4/2003 | Pietrzyk et al. |
| 7,885,196 B2 * | 2/2011 | Takeuchi ................ H04L 12/42 370/249 |

(Continued)

OTHER PUBLICATIONS

Park Hyungbae et al: "Toward Control Path High Availability for Software-Defined Networks": 2015 11th International Conference on the Design of Reliable Communication Networks (DRCN), IEEE, Mar. 24, 2015, pp. 165-172, XP033170503, DOI: 10.1109/DRCN.2015.7149008 (retrieved on Jul. 2, 2015)—(8) pages.

(Continued)

*Primary Examiner* — Sarai E Butler
(74) *Attorney, Agent, or Firm* — Boyle Fredrickson, SC

(57) ABSTRACT

A system of communicating data over a high availability industrial control system is disclosed. The industrial control system includes a first data producer, a second data producer in communicative connection with the first data producer, a first data consumer, and a second data consumer in communicative connection with the first data consumer. The system further includes the first producer communicating the data over multiple connection paths from the first producer to the first consumer and the second consumer through intermediate modules, and the second producer communicating the data over multiple connection paths from the second producer to the first consumer and the second consumer through intermediate modules. Also disclosed is a (Continued)

method of communicating data over the high availability industrial control system.

20 Claims, 25 Drawing Sheets

(58) Field of Classification Search
CPC ............ G06F 11/2005; G06F 11/2007; G06B 19/4186; G06B 19/41855; G06B 19/0423; G05B 2219/25257; H04L 49/552; H04L 12/4625; H04L 12/40176
USPC .................................................. 714/4.2, 1–57
See application file for complete search history.

(56) References Cited

U.S. PATENT DOCUMENTS

| | | | |
|---|---|---|---|
| 9,942,107 B2* | 4/2018 | Kim | G06F 9/52 |
| 2003/0118042 A1* | 6/2003 | Nishida | H04L 12/08 |
| | | | 370/404 |
| 2003/0224729 A1* | 12/2003 | Arnold | G08C 17/02 |
| | | | 455/59 |
| 2004/0039938 A1* | 2/2004 | Katz | H04L 63/1458 |
| | | | 726/2 |
| 2004/0117498 A1* | 6/2004 | Hashimoto | H04L 69/164 |
| | | | 709/230 |
| 2005/0249121 A1* | 11/2005 | Matsunaga | H04L 45/12 |
| | | | 370/238 |
| 2007/0041350 A1* | 2/2007 | Famolari | H04W 36/02 |
| | | | 370/338 |
| 2007/0116285 A1* | 5/2007 | Nakai | H04L 9/0891 |
| | | | 380/255 |
| 2008/0232358 A1* | 9/2008 | Baker | H04L 45/566 |
| | | | 370/389 |
| 2008/0294784 A1* | 11/2008 | Wang | H04L 69/163 |
| | | | 709/228 |
| 2010/0023595 A1* | 1/2010 | McMillian | G06F 15/17 |
| | | | 709/212 |
| 2010/0329248 A1* | 12/2010 | Eggert | H04L 69/326 |
| | | | 370/389 |
| 2011/0038358 A1* | 2/2011 | Wang | H04W 74/0816 |
| | | | 370/338 |
| 2011/0107157 A1* | 5/2011 | Okamoto | G06F 11/0724 |
| | | | 714/49 |
| 2012/0030769 A1* | 2/2012 | De Laet | H04N 21/26613 |
| | | | 726/26 |
| 2012/0110372 A1* | 5/2012 | Borgendale | G06F 9/546 |
| | | | 714/4.11 |
| 2013/0136102 A1* | 5/2013 | Macwan | H04W 48/16 |
| | | | 370/331 |
| 2013/0286820 A1* | 10/2013 | Angst | H04L 47/32 |
| | | | 370/225 |
| 2015/0207880 A1* | 7/2015 | Jin | G06F 11/2097 |
| | | | 714/4.11 |
| 2016/0149804 A1* | 5/2016 | Mirza | H04L 45/24 |
| | | | 370/392 |
| 2016/0226776 A1* | 8/2016 | Lee | H04L 47/562 |
| 2016/0323175 A1* | 11/2016 | Liu | H04L 12/6418 |
| 2016/0352800 A1* | 12/2016 | Mulcahy | H04L 65/1059 |
| 2017/0223045 A1* | 8/2017 | Claes | H04L 63/1433 |
| 2018/0048591 A1* | 2/2018 | Sellappa | H04L 49/254 |
| 2018/0278522 A1* | 9/2018 | Asati | H04L 69/22 |
| 2019/0012286 A1* | 1/2019 | Benedict | G06F 13/4068 |

OTHER PUBLICATIONS

Advait Dixit et al: "Towards an Elastic Distributed SDN Cantroller", Hot Topics in Software Defined Networking, ACM, 2Penn Plaza, Suite 701 New York, NY 10121-0701 USA, Aug. 16, 2013, pp. 7-12, XP058030691, DOI: 10.1145/2491185.2491193; ISBN: 978-1-4503-2178-5—(6) pages.
Extended European Search Report dated Dec. 18, 2019; Application No./Patent No. 19188033.5-1204—(12) pages.
European Examination Communication dated May 27, 2021; Application No. 19 188 033.5-1202—(6) pages.
Industrial Communication Networks; "High availability automation networks—Part 3: Parallel Redundancy Protocol (PRP) and Hight-availability Seamless Redundancy (HSR)", EIC 62439-3:2016 RLV, IEC, Mar. 31, 2016, pp. 1-540, XP082002757—(544) pages.
Clemens Hoga: "Seamless communication redundancy of IEC 62439", Advanced Power System Automation and Protection (APAP), 2011 International Conference On, IEEE, Oct. 16, 2011, pp. 489-494, XP032162391, DOI: 10.1109/APAP.2011.6180451, ISBN: 978-1-4244-9622-8—(6) pages.
Araujo J A et al.: "Duplicate and circulating frames discard methods for PRP and HSR (IEC62439-3)", IECON 2013—39th Annual Conference of the IEEE Industrial Electronics Society, IEEE, Nov. 10, 2013, pp. 4451-4456, XP032539536, ISSN: 1553-572X, DOI: 10.1109/IECON.2013.6699852—(6) pages.

* cited by examiner

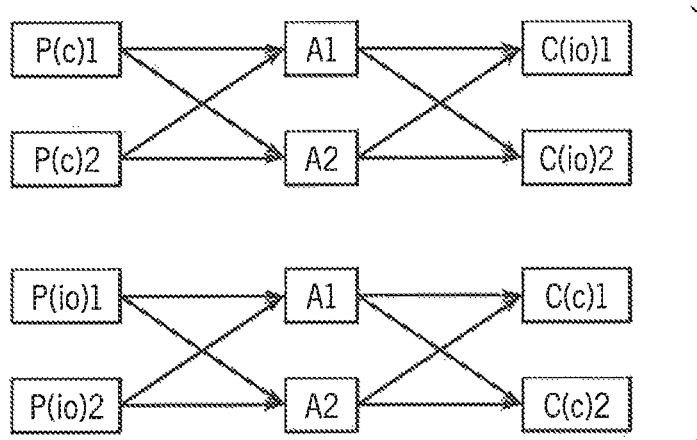
FIG. 6
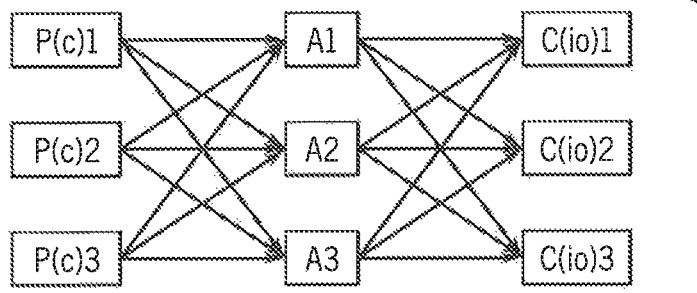
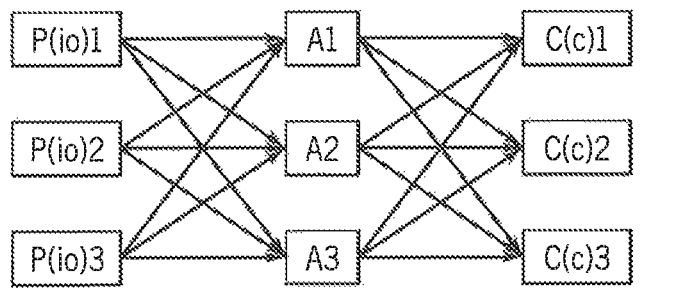
FIG. 7

SYSTEM AND METHOD OF COMMUNICATING DATA OVER HIGH AVAILABILITY INDUSTRIAL CONTROL SYSTEMS

RELATED APPLICATION

This application claims the benefit of U.S. Patent Application No. 62/703,986, entitled "System and Method of Communicating Data Over High Availability Control Systems," filed on Jul. 27, 2018, the content of which is incorporated herein by reference.

BACKGROUND INFORMATION

The subject matter disclosed herein relates to a high availability (HA) industrial control system. More specifically, the subject matter disclosed herein relates to systems and methods of communicating data over an industrial control network in a high availability industrial control system.

As is known to those skilled in the art, industrial controllers are specialized electronic computer systems used for the control of industrial processes or machinery. An example industrial controller is a programmable logic controller (PLC) used in a factory environment. Industrial controllers differ from conventional computers in a number of ways. Physically, they are constructed to be substantially more robust against shock and damage and to better resist external contaminants and extreme environmental conditions. The processors and operating systems of industrial controllers are optimized for real-time control and execute languages allowing ready customization of programs to comport with a variety of different controller applications. Industrial controllers may have an operator interface for accessing, controlling, and/or monitoring the industrial controller. An example operator interface can include a locally connected terminal having a keyboard, mouse, and display.

A HA control system attempts to maintain operation of the control system even in the event of a failure within the system. In order to maintain operation, a HA control system typically includes redundant subsystems such as redundant industrial controllers, redundant backplanes, redundant bridges, redundant adapters, redundant input/output (IO) modules, redundant motor drives, and/or redundant communication networks. Physical redundancy is provided in each subsystem such that if a single failure occurs in one of the elements in the subsystem, operation of the subsystem can continue via the redundant element(s). For example, if one of the redundant controllers fails, operation can continue using the other controller(s). Similarly, if a failure occurs on one network, backplane, bridge, adapter or IO module, the operation can continue via one or more redundant networks, backplanes, bridges, adapters, or IO modules.

During operation, a HA control system may utilize one component as an active component and the other component as a back-up component. The back-up component receives the same input signals, generates the same output signals, and/or performs the same operations as the active component such that the status of the backup-up component is identical to the status of the active component. However, actual control of the controlled system is performed by the active component. Upon failure of the active component, switches, for example, may disconnect the active component and connect the back-up component to maintain operation of the controlled system. A brief switchover time occurs as one component is disconnected and the other component is connected. Some applications, however, are so highly dependent on continuous operation that any delay, or switchover time, in the HA control system in the event of a failure in some subsystem is a detriment to the application. For example, a power plant performing a generating operation requires utmost continuous operation during the generating operation. Any delay in an HA control system due to a failure in some subsystem can be a significant detriment to the power plant.

Thus, it would be desirable to provide an improved system for communicating data over HA subsystems to further improve the fault tolerance of the HA control system.

BRIEF DESCRIPTION

The subject matter disclosed herein describes an industrial control network having concurrent connections to provide an improved system for communicating data over the network and to further improve the fault tolerance of the HA control system. A concurrent connection is the name given to the fault tolerant mechanism for industrial protocol connections at the transport layer. Concurrent connections differ from network fault tolerant mechanisms such as device level ring (DLR) and parallel redundancy protocol (PRP) that provide fault tolerance at the network layer. Concurrent connections are created by a connection open service that sets up multiple paths for redundancy from the connection originator module to the connection target module. Concurrent connections increase availability of the HA control and safety instrumented systems. More specifically, concurrent connections and architectural redundancies eliminate a single point of failure within the control system and further reduce safety connection timeouts during fault detection and/or recovery.

In one embodiment of the invention, a system of communicating data over a high availability industrial control is disclosed. The system includes a first producer, a second producer, and a first consumer. The first producer is operative to generate a first data packet for transmission, where the first data packet includes a unique identifier defining a connection for communication in the system. The second producer is operative to generate a second data packet for transmission, where the second data packet includes the unique identifier, and the second data packet is transmitted concurrently with the first data packet. The first consumer is operative to receive one of the first data packet and the second data packet first, receive one of the first data packet and the second data packet second, extract data from one of the first and second data packet which was received first, transmit the data extracted from one of the first and second data packet to a control circuit within the first consumer, identify one of the first and second data packet which was received second as redundant as a function of the unique identifier, and disregard data from one of the first and second data packet identified as redundant. The control circuit within the consumer may be a microprocessor, a programmable device such as a field programmable array, an application specific integrated circuit, separate logic devices interconnected into a circuit or the like. The control circuit carries out the function of the module in which the control circuit is located.

In another embodiment of the invention, a method of communicating data over a high availability industrial control network is disclosed. A first data packet is generated for transmission with a first producer, where the first data packet includes a unique identifier defining a connection. A second data packet is generated for transmission with a second producer, where the second data packet includes the unique identifier. Both the first data packet from the first producer and the second data packet from the second producer are transmitted to a first consumer concurrently. Either the first data packet or the second data packet is received first at the first consumer, and the other packet from the first data packet and the second data packet is received second at the first consumer. Data is extracted from whichever of the first and second data packet was received first with the first consumer. The first consumer identifies either first or the second data packet, which was received second, as redundant as a function of the unique identifier. The first consumer disregards the data from the data packet identified as redundant.

In yet another embodiment of the invention, a method for opening connections in a high availability industrial control network is disclosed. A unique connection identifier is generated with a pair of originators, where the pair of originators includes a first originator and a second originator. The unique connection identifier is stored in memory of each of the pair of originators. A first concurrent connection open request is generated in the first originator, and a second concurrent connection open request is generated in the second originator. Each of the first and second concurrent connection open requests includes the unique connection identifier. The first concurrent connection open request is transmitted from the first originator to a first target on a per hop basis to establish a first communication path, and the second concurrent connection open request is transmitted from the second originator to the first target on a per hop basis to establish a second communication path. The first target receives the first concurrent open request and the second concurrent open request serially. A connection in the industrial control network is marked as open with the first target responsive to receiving the first concurrent open request, and the second concurrent open request is identified as being part of the connection responsive to receiving the second concurrent open request.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which:

FIG. 6 is a runtime data flow diagram representation of one embodiment of a concurrent connection established in the high availability control system of FIG. 5;

FIG. 7 is a runtime data flow diagram representation of another embodiment of a concurrent connection established in a high availability control system with triple redundancy;

Figure 1:
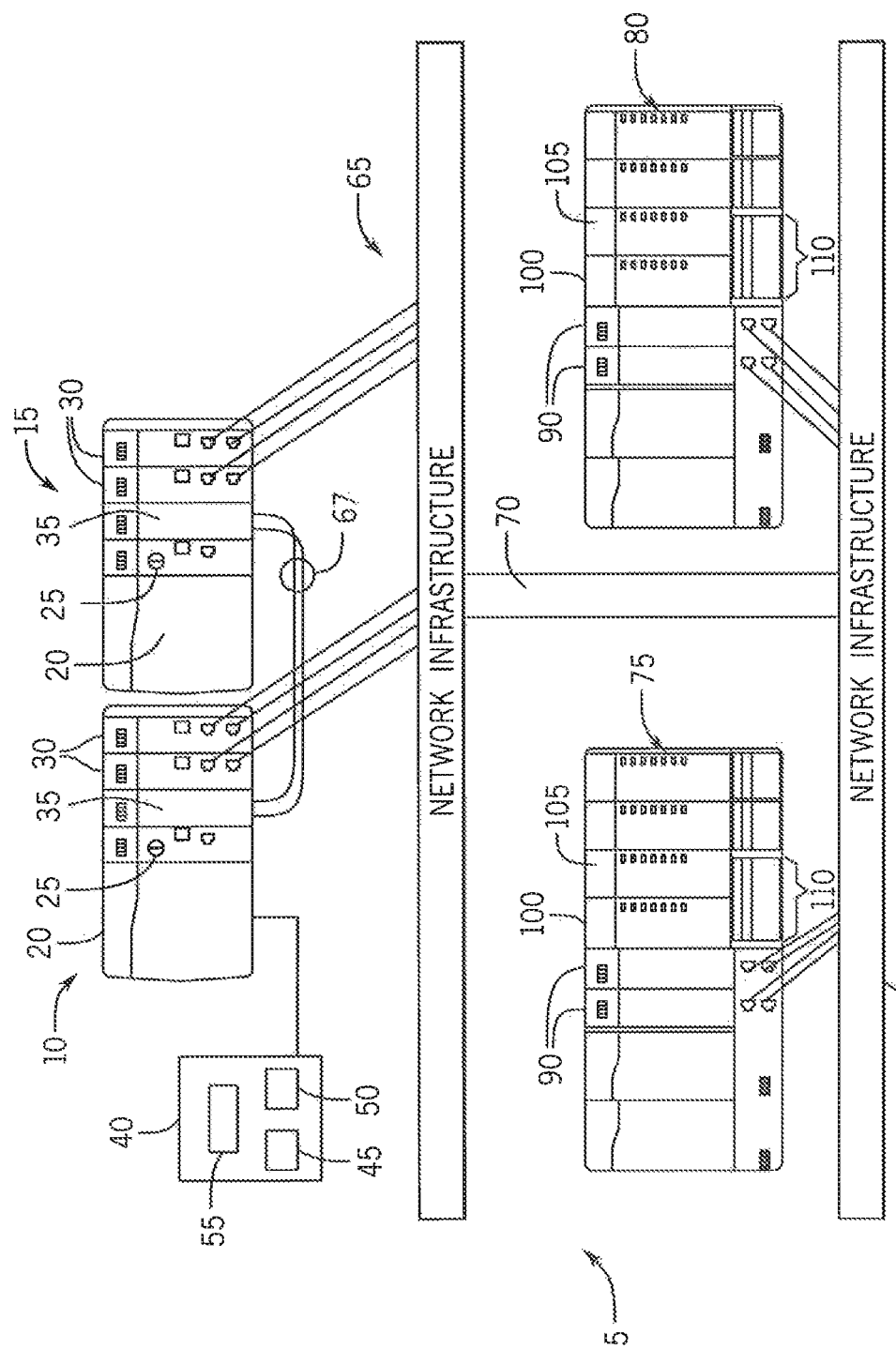
FIG. 1 is a block diagram of one embodiment of a high availability industrial control system.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Figure 2:
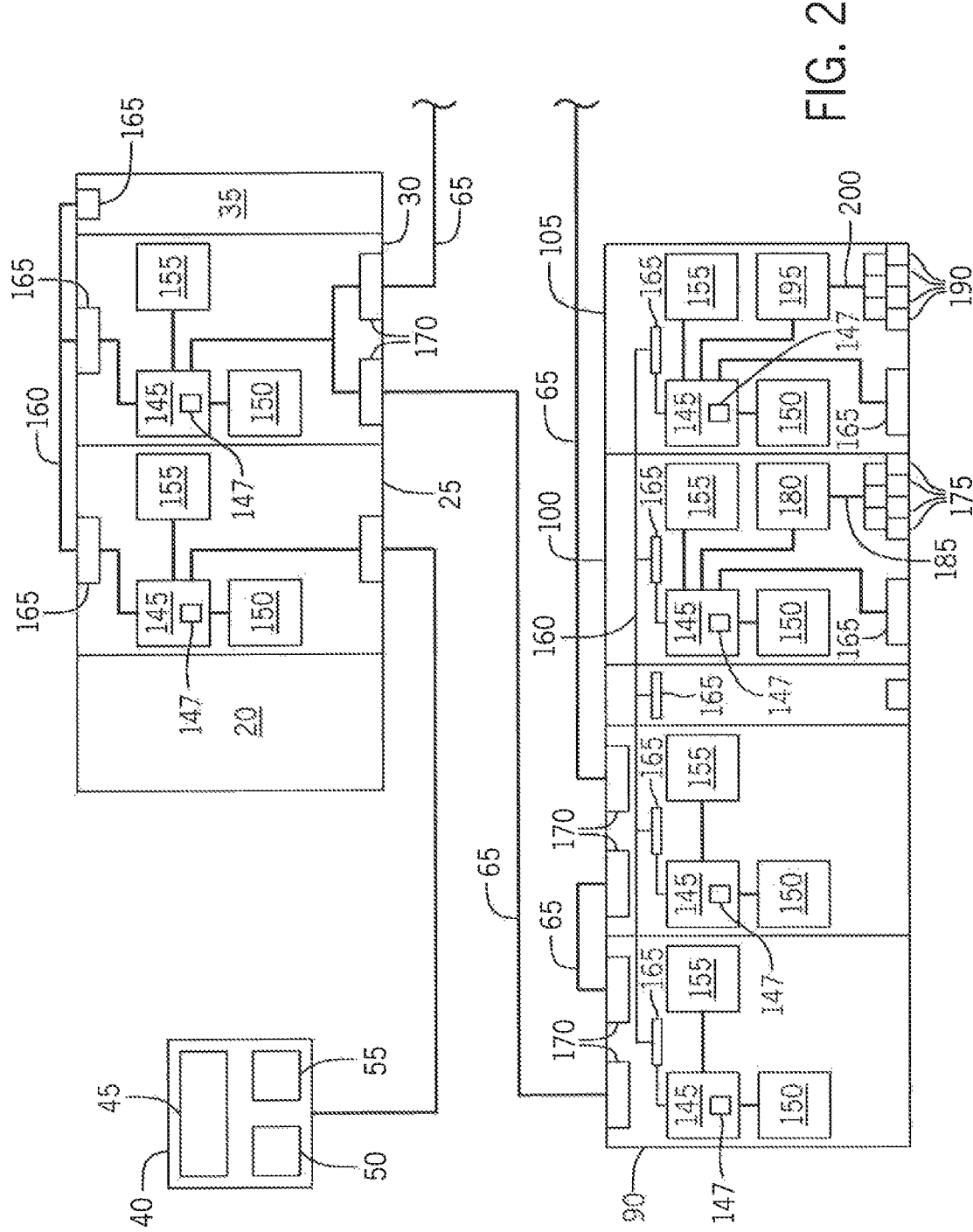
FIG. 2 is a block diagram further representing aspects of the industrial control system of FIG. 1.

Turning first to FIG. 1 and FIG. 2, an exemplary industrial control system 5 with redundant subsystems is illustrated. The industrial control system 5 includes a first controller chassis 10 and a second controller chassis 15. As illustrated, the first and second controller chassis 10 and 15 are modular and may be made up of numerous different modules. Additional modules may be added or existing modules removed and the first and second controller chassis 10 and 15 reconfigured to accommodate the new configuration. Optionally, either the first controller chassis 10 and/or the second controller chassis 15 may have a predetermined and fixed configuration. The first and second controller chassis 10 and 15 may have a single backplane or dual backplanes to facilitate communication between modules in the chassis. In the exemplary system shown, both the first and second controller chassis 10 and 15 include a power supply module 20, a controller module (or also referred to as simply "controller") 25, and network bridge modules 30. Each controller chassis 10 and 15 is further shown with an additional module 35 that may be selected according to the application requirements. For example, the additional module 35 may be an analog or digital input or output module, which will be referred to herein generally as an IO module. Optionally, each chassis may be configured to have multiple additional modules 35 according to the application requirements. For ease of illustration, a single additional module 35 is illustrated and the illustrated module is a redundancy module to facilitate dual chassis controller redundancy.

An operator interface 40 is shown connected to the industrial control system. The operator interface 40 can include a processing device 45 and an input device 50. The input device 50 can include, but not limited to, a keyboard, touchpad, mouse, track ball, or touch screen. The operator interface can further include an output device 55. The output device 55 can include, but is not limited to, a display, a speaker, or a printer. It is contemplated that each component of the operator interface 40 may be incorporated into a single unit, such as an industrial computer, laptop, or tablet computer. It is further contemplated that multiple operator interfaces can be distributed about the industrial control system 5. The operator interface 40 may be used to display operating parameters and/or conditions of the controlled machine or process, receive commands from the operator, or change and/or load a control program or configuration parameters. An interface cable connects the operator interface 40 to the controller 25 on the first controller chassis 10.

The first and second controller chassis 10 and 15 are connected to other devices by a network 65 according to the application requirements. A redundant network topology is established by connecting the network bridge modules 30 of the controller chassis 10 and 15 to a redundant network infrastructure 70 by a suitable network of cables. The network infrastructure 70 connects to a first remote chassis 75 and a second remote chassis 80. It is contemplated that the network cables may be custom cables configured to communicate via a proprietary interface or may be any standard industrial network, including, but not limited to, Ethernet/IP, DeviceNet, or ControlNet. The network bridge modules 30 and the network 70 are configured to communicate according to the protocol of the network to which it is connected and may be further configured to translate messages between two different network protocols. Dedicated interface cables 67 connect the redundancy modules 35 in each chassis to each other, providing a dedicated communication channel between the controller modules 25.

The first and second remote chassis 75 and 80 are positioned at varying positions about the controlled machine or process. As illustrated, the first and second remote chassis 75 and 80 are modular and may be made up of numerous different modules connected together in a chassis or mounted on a rail. Additional modules may be added or existing modules removed and the remote chassis 75 or 80 reconfigured to accommodate the new configuration. Optionally, the first and second remote chassis 75 and 80 may have a predetermined and fixed configuration. The first and second remote chassis 75 and 80 may have a single backplane or dual backplanes to facilitate communication between modules in the chassis. As illustrated, the first and second remote chassis 75 and 80 each includes a pair of network adapter modules 90, an input module 100, and an output module 105. Each network adapter module 90 is connected to the redundant network infrastructure 70 by a suitable network of cables. Each of the input modules 100 is configured to receive input signals from controlled devices, and each of the output modules 105 is configured to provide output signals to the controlled devices. Optionally, still other modules may be included in a remote chassis. Dual or triple redundant input modules 100 and/or output modules 105 may be included in a remote and/or controller chassis. It is understood that the industrial control network, industrial controller, and remote chassis may take numerous other forms and configurations without deviating from the scope of the invention. It should also be understood that an input module 100 and an output module 105 can form an IO module 110.

Referring next to FIG. 2, a portion of the exemplary industrial control system of FIG. 1 is illustrated in block diagram form. It is contemplated that each of the modules in the system may include a processor 145 and a memory 150. The processors 145 are configured to execute instructions and to access or store operating data and/or configuration parameters stored in the corresponding memory 150. The processors 145 are suitable processors according to the node requirements. It is contemplated that the processors 145 may include a single processing device or multiple processing devices executing in parallel and may be implemented in separate electronic devices or incorporated on a single electronic device, such as a field programmable gate array (FPGA) or application specific integrated circuit (ASIC). The processors 145 include random access memory 147 for processing runtime data. The memory devices 150 are non-transitory storage mediums that may be a single device, multiple devices, or may be incorporated in part or in whole within the FPGA or ASIC. Each of the modules also includes a clock circuit 155, and each clock circuit 155 is preferably synchronized with the other clock circuits 155 according to, for example, the IEEE-1588 clock synchronization standard. Each clock circuit 155 generates a time signal configurable to report the present time accurate to either microseconds or nanoseconds. Communication between modules mounted in the same chassis or contained within a single housing occurs via a backplane 160. The backplane 160 may be a single backplane or dual backplanes and include a corresponding backplane connector 165. Modules communicating via network media include ports 170 configured to process the corresponding network protocol. The input module 100 includes input terminals 175 configured to receive the input signals from the controlled devices. The input module 100 also includes any associated logic circuitry 180 and internal connections 185 required to process and transfer the input signals from the input terminals 175 to the processor 145. Similarly, each output module 105 includes output terminals 190 configured to transmit the output signals to the controlled devices. The output module 105 also includes any associated logic circuitry 195 and internal connections 200 required to process and transfer the output signals from the processor 145 to the output terminals 190.

In operation, a connection is the transport layer mechanism in an industrial protocol to transfer bi-directional data between two end points typically at a given periodic interval. Some connection types do not transfer data at periodic interval, but instead, transfer data either on occurrence of an event or in response to a programmatic request/response mechanism. Some connections transfer data in only one direction while in the reverse direction only a heartbeat indication is sent to keep the connection alive. But, in general, connections transfer data in both directions.

A connection is opened by a connection open service request from a connection originator module to a connection target module through zero or more intermediate modules via messages sent over backplane(s) and/or network(s). The connection originator module is usually a controller module in a controller chassis or a human machine interface (HMI). The connection target module may be, for example, an IO module, a motor drive module, another controller module, network adapter module, or a network bridge module in the same chassis as controller module or in a remote chassis. The intermediate modules may be one or more of a network bridge module and/or network adapter module. The connection open request message contains parameters defining the connection such as a connection type, data size to transfer in each direction, a duration of a periodic interval at which the message is transmitted, a connection timeout duration, an end-to-end path from the originator module to the target module through intermediate modules, and the like. These parameters are used to allocate resources (e.g., CPU bandwidth, memory, and network bandwidth) to service the connection at runtime on a module associated with the connection. When resources are successfully allocated on the modules associated with a connection, a success response is conveyed back from the target module to the originator module in a reverse direction from the connection open request, and the connection is operational for runtime data transfer. If the resources cannot be allocated on one of the modules associated with a connection or if one of the modules cannot communicate the connection open request message to the next module in the path, then a failure response is returned to the originator module from the module at which the connection open request failed.

Once a connection is opened, it can be closed either through a connection close service request from the originator module to the target module of the connection through any intermediate modules that are part of the connection. Optionally, the connection may also be closed through a runtime connection timeout mechanism. During runtime, every module that is part of a connection monitors data reception from its upstream module(s) in one or both directions as appropriate for an end module or an intermediate module, respectively, and when data is not received in the monitored direction for a length of time equal to the connection timeout duration, the module at which the connection timeout occurred will close the connection to recover allocated resources. A connection timeout may happen as a result of a module failure or of a communication failure in a network or a backplane.

Figure 3:
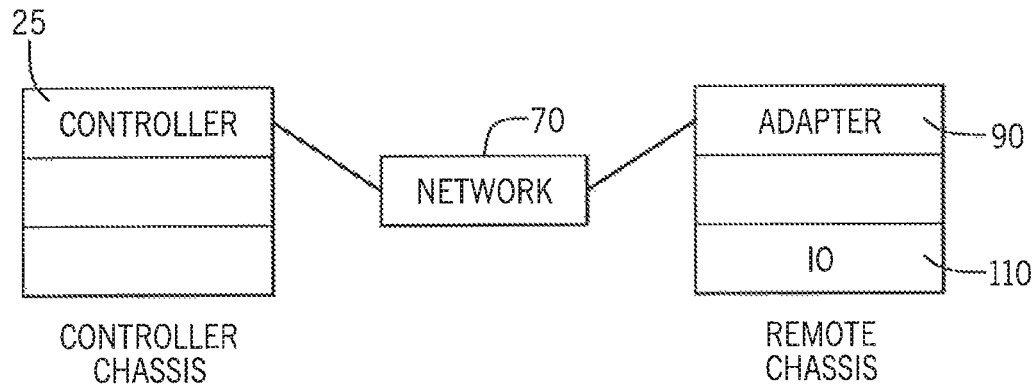
FIG. 3 is a block diagram representing one embodiment of an exemplary industrial control system in which the present invention may be incorporated.

Turning next to FIG. 3, a first embodiment of a control system includes a controller module 25 in a controller chassis, and a network adapter module 90 and an IO module 110 in a remote chassis, where the controller chassis and the remote chassis are connected via a network infrastructure 70. The controller module 25 is capable of directly communicating on the network and is connected to network infrastructure 70 through a network cable. Similarly, the network adapter module 90 on the remote chassis is connected to the network infrastructure 70 through a network cable and communicates with an IO module 110 on the same chassis over a backplane within the chassis. A connection is opened from the controller module 25, acting as a connection originator module, to the IO module 110, acting as a connection target module, by sending a connection open request message over the network infrastructure 70 to the network adapter module 90 on the remote chassis, where the network adapter module is acting as an intermediate module. The network adapter module 90 in turn sends the connection open message to the IO module 110 over the backplane in the chassis. A success response is returned from the IO module 110 to the controller module 25 in the reverse direction via the network adapter module 90 and the network infrastructure 70 and the connection is now open to transfer data.

Once the connection has been established, the modules are no longer referred to as an originator module and a target module, as used during the open/close process. Rather, the terms producer and consumer are used to identify a runtime data producer and data consumer in a connection. Since the data transfer is bidirectional in general, there controller module 25 is both a producer, P(c), and a consumer C(c), depending on the source and direction of the data flow. Similarly, the IO module 110 is both a producer, P(io), and a consumer, C(io), depending on the source and direction of the data flow.

Figure 4:
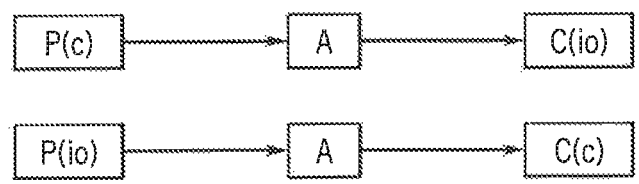
FIG. 4 is a runtime data flow diagram representation of a prior art connection established in the control system of FIG. 3.

With reference to FIG. 4, a representation of the bidirectional data flow in a prior art connection is illustrated. A runtime data flow model corresponding to the modules in FIG. 3 is shown with block A representing the network adapter module 90. Previously, a connection established a single end-to-end path for bidirectional data flow. As illustrated, data flows in one direction from P(io) to C(c) when the IO module 110 is generating data and sending the data to the controller module 25 via the connection, and data flows in the other direction from P(c) to C(io) when the controller module 25 is generating data and sending the data to the IO module 110. The prior art connection, however, has only one end-to end path identified between the originator module and the target module with bi-directional runtime data flow capability when the connection is established.

Figure 5:
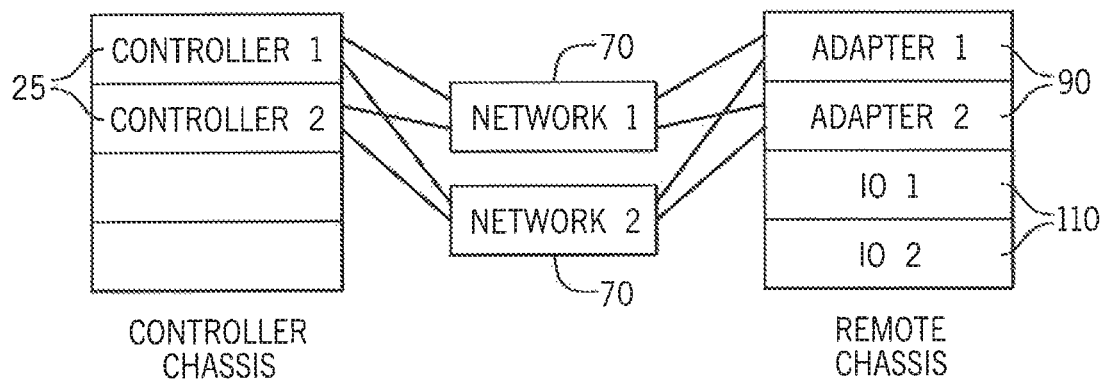
FIG. 5 is a block diagram representing another embodiment of a high availability control system incorporating the present invention.

The present invention provides for multiple end-to-end paths in a single connection, improving the reliability of a HA control system. A HA control system typically includes several redundant subsystems such as redundant industrial controllers, redundant backplanes, redundant bridges, redundant adapters, redundant input/output (IO) modules, redundant motor drives, and/or redundant communication networks. Physical redundancy is provided in each subsystem such that if a failure occurs in one of the elements in a subsystem the operation can continue via the other element(s). With reference next to FIG. 5, one embodiment of a HA control system with redundant subsystems is illustrated. The illustrated embodiment includes two controllers 25, Controller 1 and Controller 2, in the controller chassis. The controllers 25 communicate with each other through a dual backplane in the controller chassis. Each of the controllers 25 is connected to two network infrastructures 70, Network 1 and Network 2, through network cables. The remote chassis contains two IO modules 110, IO 1 and IO 2, and two network adapter modules 90, Adapter 1 and Adapter 2. The IO modules 110 and network adapter modules 90 on the remote chassis communicate with each other through dual backplanes within the remote chassis. The network adapter modules 90 are each connected to the two network infrastructures 70 through network cables. The IO modules 110 have a limited number of IO terminal points, for example, eight IO terminals, which can be connected to controlled devices. Each corresponding IO terminal on both redundant IO modules 110 on the remote chassis is wired to same controlled device for redundancy. Although illustrated with a single pair of redundant IO modules 110 and eight IO terminals, a typical HA control system has thousands of such redundant IO terminal points wired to controlled devices throughout the controlled machine or process.

In a HA control system, a concurrent connection is used for bi-directional data transfer between redundant end modules, for example, between the redundant controllers 25 and redundant IO modules 110 shown in FIG. 5. A concurrent connection is the fault tolerant transport layer mechanism to transfer bi-directional data between multiple redundant end points in a HA control system at periodic intervals, responsive to events triggering a transfer, or responsive to a request/response transfer. A concurrent connection sets up and manages bi-directional data transfer between redundant end modules over multiple redundant end-to-end paths using the physical redundancies in each subsystem such that one or more failures in different subsystems will not affect data transfer so long as at least one end module is available at each end and at least one end-to-end path is available for data transfer between the modules at each end of the connection. Concurrent connections have architectural flexibility to deal with varying levels of physical redundancy in each subsystem. For example, a concurrent connection can handle subsystems with no, or with varying levels of redundancy, such as a single controller, dual redundant adapters, and triple redundant IO modules. A typical HA control system has thousands of concurrent connections between redundant controllers and redundant IO modules, between redundant controllers and other redundant controllers, between redundant controllers and a human machine interface (HMI), or a combination thereof.

A single concurrent connection has multiple end-to-end data paths between redundant end modules. With reference next to FIG. 6, a runtime data flow model is illustrated for a single concurrent connection in the exemplary HA control system from FIG. 5. In a first direction of data flow, the IO modules 110 may both be producers, P(io)1 and P(io)2, and the controllers 25 may both be consumers, C(c)1 and C(c)2. In the other direction of data flow, the controllers 25 may both be producers, P(c)1 and P(c)2, and the IO modules 110 may both be consumers, C(io)1 and C(io)2. The two network adapter modules 90 are represented by A1 and A2. According to the illustrated flow model, there are three module stages (i.e. a controller stage, an adapter stage, and an IO module stage) with dual redundancy in each stage.

As will be discussed in more detail below, identical data is transmitted from each producer to each consumer in tandem via redundant data packets along the different end-to-end paths in a single concurrent connection. There are eight end-to-end paths that can be used for bi-directional data transfer of the same data. Examples of end-to-end paths are P(c)1:A1:C(io)1; P(c)2:A1:C(io)1; and etc. with their corresponding reverse paths. So long as at least one controller module 25 and one IO module 110 and one of the end-to-end data paths between them are working, data is communicated between the modules and control can be maintained.

With reference next to FIG. 7, another runtime data flow model is illustrated for a concurrent connection established in a HA control system with three stages and triple redundancy in each stage. In other words, the controller chassis includes three redundant controllers 25, the remote chassis includes three redundant IO modules 110 and three redundant network adapter modules 90. Similarly, a triple redundant network infrastructure 70 is established between the controller chassis and the remote chassis. In the illustrated embodiment, there are twenty-seven end-to-end paths that can be used for data transfer in the single concurrent connection.

Figure 8:
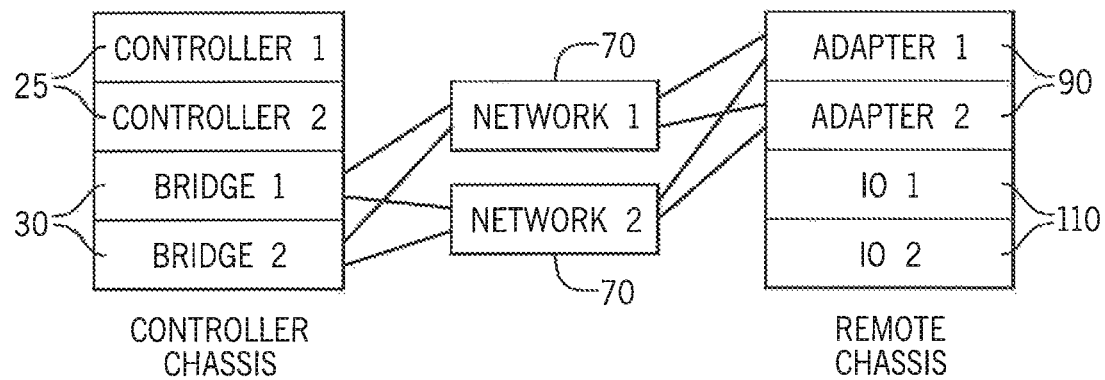
FIG. 8 is a block diagram representing another embodiment of a high availability control system incorporating the present invention.
Figure 9:
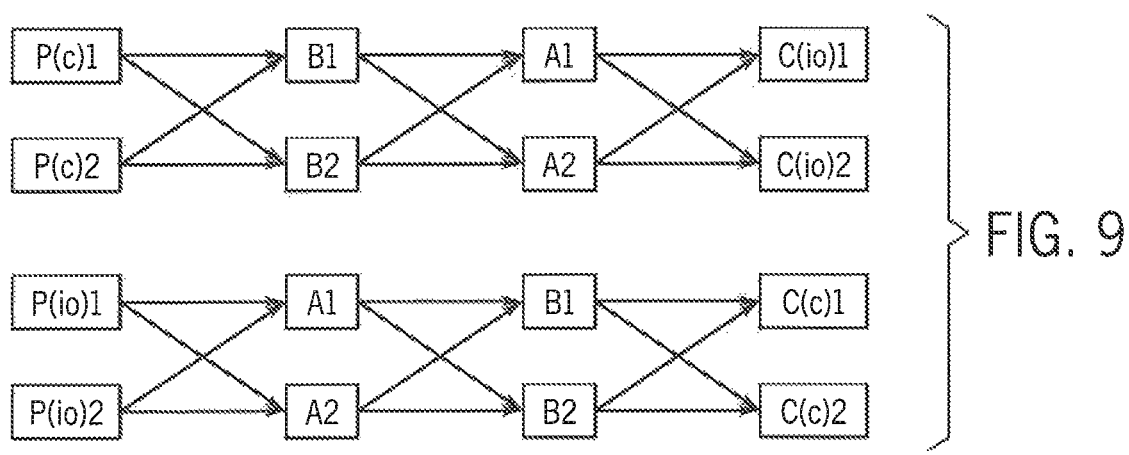
FIG. 9 is a runtime data flow diagram representation of one embodiment of a concurrent connection established in the high availability control system of FIG. 8.

With reference also to FIG. 8, another embodiment of a HA control system with network bridge modules 30 included is illustrated, and FIG. 9 shows the runtime data flow model for a concurrent connection established in the HA control system of FIG. 8. The bridge modules 30 are represented by B1 and B2 in the data flow model. There are four stages (i.e. a controller stage, a bridge stage, an adapter stage, and an IO module stage) and dual redundancy in each stage. In this case there are sixteen end-to-end paths that can be used for data transfer.

Figure 10:
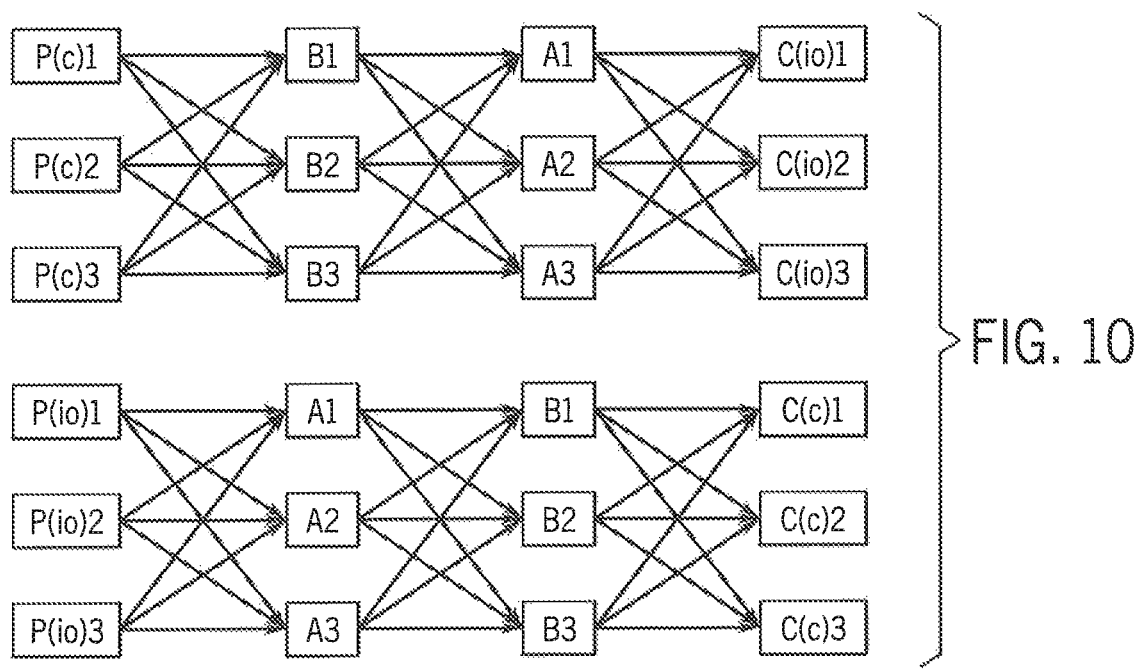
FIG. 10 is a runtime data flow diagram representation of another embodiment of a concurrent connection established in a high availability control system with triple redundancy.

FIG. 10 shows another runtime data flow model for a concurrent connection established in a HA control system with four stages and triple redundancy in each stage. In other words, the controller chassis includes three redundant controllers 25 and three redundant network bridge modules 30. The remote chassis includes three redundant IO modules 110 and three redundant network adapter modules 90. Similarly, a triple redundant network infrastructure 70 is established between the controller chassis and the remote chassis. In this case, there are eighty-one end-to-end paths that can be used for data transfer. In general, if there are "n" stages, R1 is the number of redundant modules in stage 1, R2 is the number of redundant modules in stage 2, and Rn is the number of redundancy in stage n, then the total number of end-to-end paths in the HA control system is equal to R1×R2× . . . ×Rn. For the specific case in which all "n" stages have the same number of redundant modules, then this expression simplifies to $R^n$. In other words, the number of end-to-end paths available for data transfer grows exponentially with the number of stages and the number of redundant modules in each stage.

One aspect of establishing a concurrent connection is the establishment of redundant end-to-end data paths between end modules in a single connection. If a similar operation were desired using the prior art connections of FIG. 3, significant extra resources would be required. With reference, for example, to the system illustrated in FIG. 8, each controller 25 as an originator module would need to first identify all end-to-end paths available between itself and the target modules. In the illustrated embodiment, each controller 25 will then be required to open eight standard connections from itself to the IO modules 110 as target modules, resulting in sixteen standard connections between the redundant controllers 25 and redundant IO modules 110.

Implementing multiple standard connections to create redundant communication paths includes a number of drawbacks. Assuming that all of the modules and end-to-end paths are active along the sixteen standard connections, each end module needs to allocate eight sets of resources, where one set of resources corresponds to each of the eight standard connections. Each end module needs to transmit or receive eight data packets, where one data packet is transmitted on each of the eight standard connections for each data production cycle. Each intermediate module needs to receive and transmit all of the data packets passing through that intermediate for each data production cycle as well. Finally, each consumer end module needs to identify and drop up to seven duplicate data packets for every data production cycle.

On the other hand, using multiple standard connections to create redundant communication paths allows all available end-to-end data paths to be opened and all resources allocated as part of connection open process so there is no risk of runtime failure to allocate resources. In general, the number of resources required and the number of data packets that need to be processed at runtime to create redundant communication paths using multiple standard connections are dependent on both the number of stages and the number of redundant modules in each stage.

In contrast, one concurrent connection encompasses all sixteen of the end-to-end paths defined in these standard connections. Establishing the concurrent connection to encompass each of these end-to-end paths will be discussed again with respect to the system illustrated in FIG. 8. In contrast to the standard connection, which defines end-to-end data paths, the concurrent connection defines per hop connections. Per hop connections are identified and opened by all modules which are part of a concurrent connection on a hop-by-hop basis. A per hop connection refers to the connection on the local data path from an upstream module to an immediate downstream module. Controller 1 will open per hop connections to Bridge 1 and Bridge 2, Bridge 1 will open per hop connections to Adapter 1 and Adapter 2, and so on. A total of twelve per hop connections are opened on local data paths compared to sixteen standard connections for end-to-end paths as previously discussed. All twelve per hop connections form part of a single concurrent connection identified with a single concurrent connection serial number.

In contrast to the eight sets of resources required for separate end-to-end connections, each module needs to allocate only one set of resources with some minor additional overhead. In addition, each module needs to send and/or receive only two data packets per data production cycle. For example, referring to FIG. 9, each controller 25 as a producer sends two copies of the same data packet to each of the two network bridge modules 30 at the end of the hop. Only the first non-erroneous data packet received by a network bridge module 30 is forwarded on to each of the two network adapter modules 90 in a downstream hop. Any duplicate data packets received by the network bridge module are dropped at a low level without consuming a lot of CPU bandwidth. In the data flow model of FIG. 9, only two redundant modules exist per stage. Therefore, the network bridge module 30 will forward the first non-erroneous data packet received and drop the second packet received as duplicative. In the data flow model of FIG. 10, three redundant modules exist per stage. Therefore, the network bridge module 30 would forward the first non-erroneous data packet received and drop the second and third packets received as duplicative.

Similarly, only the first non-erroneous data packet received by a network adapter module 90 is forwarded on to each of the two IO modules 110 as consumer modules in still another downstream hop. Any duplicate data packets received by the network adapter module 90 are dropped at a low level without consuming a lot of CPU bandwidth. Similarly, only the first non-erroneous data packet received by each of the IO modules 110 is processed. Any duplicate data packets received by the IO module 110 are dropped at a low level without consuming a lot of CPU bandwidth. Data flow in the reverse direction is also handled in a similar manner with the IO modules 110 becoming the producer modules and the controllers 25 becoming the consumer modules. In short, each module in FIG. 8 needs to process only two data packets if a concurrent connection defines the redundant communication paths in comparison to eight data packets processed per module if separate end-to-end connections define the redundant communication paths The concurrent connection enjoys the advantages of separate end-to-end connections without the associated drawbacks. All possible end-to-end data paths are active to transmit data in the absence of faults with the per hop configuration just as with separate end-to-end connections. When a fault happens in a local data path, only the associated hop connection needs to be closed. While multiple data paths between the producer and consumer may be affected because of a single, local data path fault (i.e., due to closing the per hop connection), the impact is the same as if the same fault occurred with separate end-to-end connections defined. However, if multiple separate end-to-end connections are defined, multiple connections would need to be closed. When a fault happens in a module, multiple upstream and/or downstream hop connections may need to be closed. However, as long as one controller 25, one IO module 110, and one data path between them are active, control can be maintained on a concurrent connection.

Figure 11:
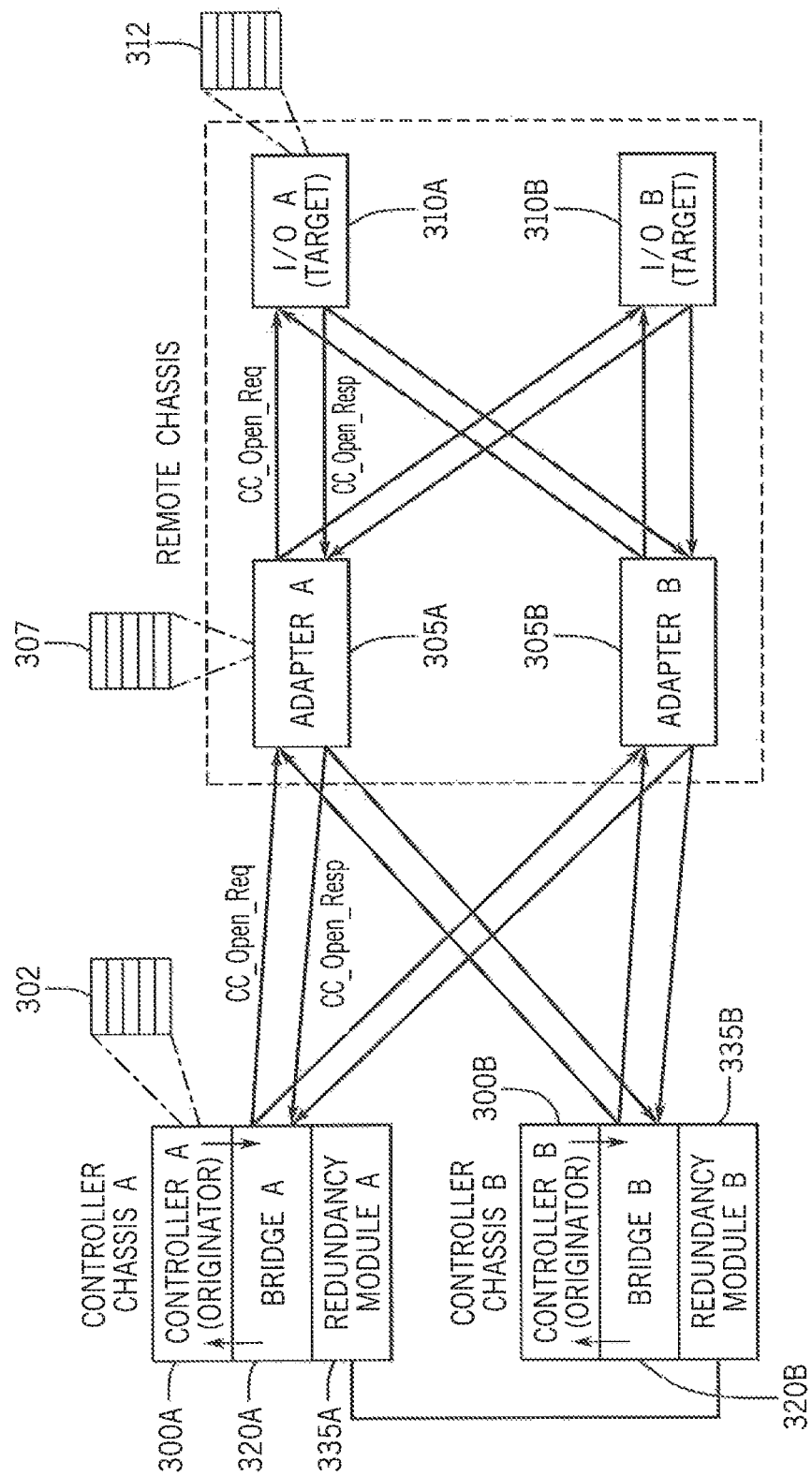
FIG. 11 is flow diagram illustrating message flow between modules for a concurrent connection open process in an exemplary high availability control system.

A more detailed description of the concurrent connections will now be provided. FIG. 11 shows the message flow model for a concurrent connection open process in an exemplary HA control system for a single concurrent connection. It should be noted that FIG. 11 only shows message flow and not all physical arrangements such as network infrastructure, backplanes, and the like. According to the illustrated embodiment, two controller chassis, Controller Chassis A and Controller Chassis B, are configured in a dual chassis redundancy mode. Each controller chassis includes a controller 300, a bridge module 320, and a redundancy module 335. Controller Chassis A contains Controller A 300A and Bridge A 320A. Controller Chassis B contains Controller B 300B and Bridge B 320B. There is a remote chassis with two adapter modules 305, Adapter A 305A and Adapter B 305B, and two IO modules 310, IO module A 310A and IO module B 310B. In addition, there are two redundancy modules, Redundancy Module A 335A and Redundancy Module B 335B, where one redundancy module is located in each controller chassis. The redundancy modules 335 are provided to facilitate communication between Controller A 300A and Controller B 300B. Each controller 300 includes a stored user control program which contains information such as control tasks to be executed, user routines that are part of those tasks, and the information for all concurrent connections that need to be created. The stored information for a concurrent connection includes parameters such as connection type, data size to transfer in each direction, duration of a periodic interval at which the message is to be transmitted, connection timeout duration, and logical path information for all modules that are part of the concurrent connection. The two controllers 300 are connection originators and are establishing a concurrent connection with the two IO modules 310, which are connection targets during the concurrent connection open process.

The two controllers 300 open concurrent connections as part of a startup process for the user control program stored in each controller. Before opening a concurrent connection, the two controllers 300 exchange connection information with each other and generate a globally unique concurrent connection serial number for each concurrent connection. The unique serial numbers for each concurrent connection are stored in each controller and are utilized during the connection open request.

To open a concurrent connection, each of the two controllers 300 first allocate resources for a per hop connection from the controller 300 to the bridge 320 on their respective chassis. The information about those allocated resources is stored along with concurrent connection parameters into a per concurrent connection control data structure (e.g., the table identified by reference numeral 302 for Controller A 300A). Then the two controllers, Controller A 300A and Controller B 300 B, each send a concurrent connection open request message, CC_Open_Req, to Bridge A 320A and Bridge B 320B, respectively, over the backplane to the bridge module 320 located on the respective controller chassis.

Figures 12, 13:
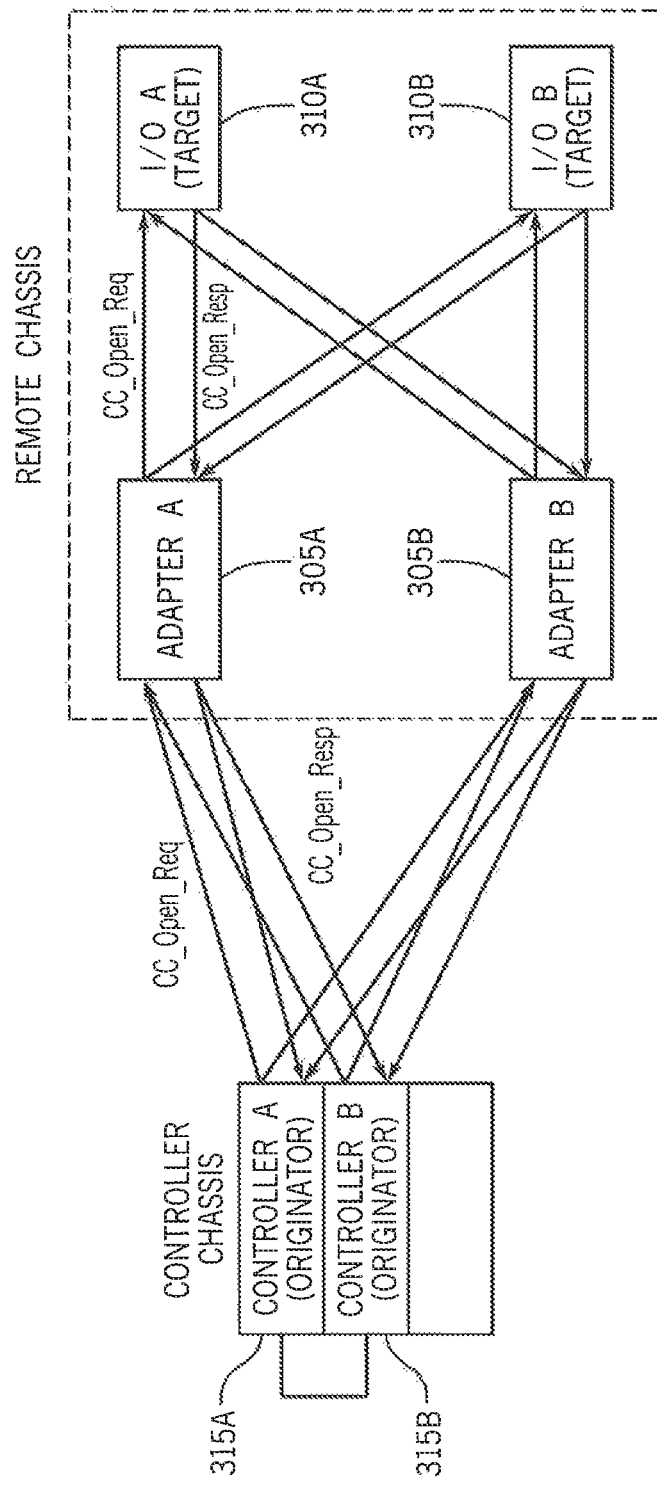
FIG. 12 is a block diagram representation of a data message format for a concurrent connection open request according to one embodiment of the invention.
FIG. 13 is flow diagram illustrating message flow between modules for a concurrent connection open process in another exemplary high availability control system.

FIG. 12 shows the message format for a concurrent connection open request. The message packet contains one or more backplane or network specific header(s) as required for the communication mediums over which the message packet is transmitted. The backplane or network specific headers are followed by an industrial protocol header, which includes message type information indicating, for example, that the message packet is a concurrent connection open request. The message packet then includes connection parameters and a packet CRC. The connection parameters include information such as the globally unique concurrent connection serial number, connection type, data size to transfer in each direction, duration of a periodic interval at which the message is to be transmitted, connection timeout duration, and the logical path defining each of the modules that are part of connection. Table 1, included below, provides exemplary logical path information to downstream modules that may be encoded in the connection parameters for the concurrent connection open request. Each controller 300 includes a complete set of addresses for which per hop connections are to be established in a concurrent connection. In addition to the information included below, the controller 300 would also have parameters defining whether bridge modules 320 are included and, if so, how many and at what logical address they are located. The controller 300 establishes the per hop connection to each bridge module 320 and passes the information for the adapter modules 305 and the IO modules 310 to the bridge modules in the concurrent connection open request message. Each bridge module 320 will establish the per hop connection to each adapter module 305 and passes the information for the IO modules 310 to the adapter modules in the concurrent connection open request message. Thus, as each per hop connection is established, information for the subsequent per hop connections are passed along in the concurrent connection open request message.

TABLE 1

Exemplary Logical Path Information for a Concurrent Connection Open Request

| Module | Encoded Logical Addresses | Description |
| --- | --- | --- |
| Adapter | 2: | Number of adapters: |
|  | 192.168.1.101; | Network address of adapter A; |
|  | 192.168.1.201 | Network address of adapter B |
| IO | 2: | Number of IO modules: |
|  | 5; | Backplane slot address of IO A; |
|  | 6 | Backplane slot address of IO B; |

Referring back to FIG. 11, when each of the two bridge modules 320 receive the concurrent open request message from the respective controller 300, each bridge module 320 will save information about the sender of the message and all connection parameters, including the unique concurrent connection serial number, that were part of the message into a per concurrent connection control data structure within the bridge module. Each bridge module 320 will then allocate resources for per hop connections to the upstream controllers 300 and for per hop connections to the two downstream adapter modules 305. The information for each of these allocated resources will be saved into the per concurrent connection control data structure. Each bridge module 320 will then send a concurrent open request message to the two downstream adapter modules 305 over the network to establish the next per hop connection.

Each adapter module 305 will, in turn, receive two concurrent connection open request messages, one from each upstream bridge module 320. Due to the serial transmission nature of network communication, the two concurrent connection open request messages will be received by each adapter module 305 at different times. When each adapter module 305 receives the first concurrent open request message from an upstream bridge module 320, it will save information about the sender of the message and all connection parameters, including the unique concurrent connection serial number, that were part of the message into a per concurrent connection control data structure (e.g., the table identified by reference numeral 307 for Adapter A 305A). Each adapter module 305 will then allocate resources for a per hop connection to the upstream bridge modules 320 and for per hop connections to the two downstream IO modules 310. The information for each of these allocated resources will be saved into the per concurrent connection control data structure. Each adapter module 305 will then send a concurrent open request message to the two downstream IO modules 310 over the backplane on the remote chassis to establish the next per hop connection.

When each adapter module 305 receives the second concurrent open request message from the upstream bridge modules 320, the adapter module 305 compares the globally unique concurrent connection serial number in the second open request message received with the concurrent connection serial number from the first open request message that has been saved in the per concurrent connection control data structure. When the concurrent connection serial number matches a previously stored serial number, the adapter module 305 identifies this message as a redundant message, and the adapter module 305 will join the second connection open request message to the saved concurrent connection information in the per concurrent connection control data structure by adding the second sender information to the concurrent connection information and will use the resources already allocated for upstream and downstream per hop connections. Thus, as each module receives redundant concurrent connection open requests from upstream modules, the module will identify each upstream hop to which it is connected but will only forward a single concurrent connection open request (rather than forwarding each of the concurrent connection open requests) to each of the further downstream modules to which the module is to establish a downstream hop connection.

Each IO module 310 will next receive two concurrent connection open request messages, one from each upstream adapter module 305. Due to the serial transmission nature of backplane communication, the two concurrent connection open request messages will be received by each IO module 310 at different times. When each IO module 310 receives the first concurrent open request message from an upstream adapter module 305, it will save information about the sender of the message and all connection parameters, including the unique concurrent connection serial number, that were part of the message into a per concurrent connection control data structure (e.g., the table identified by reference numeral 312 for IO Module A 310A). Note, only three concurrent connection control data structures are illustrated for convenience. Nevertheless, it is understood that each module within the concurrent connection will maintain its own concurrent connection control data structure. Each IO module 310 will then allocate resources for a per hop connection to the upstream adapter modules 305 and save information about those resources into a per concurrent connection control data structure. Each IO module 310 will then mark the concurrent connection status as open and will mark the hop path from the first upstream adapter module 305 as open. After establishing the concurrent connection as open, each IO module 310 will generate and send a concurrent connection open response message with a success status to the first upstream adapter module 305 from which it received the connection open request over the backplane on the remote chassis.

When each IO module 310 receives the second concurrent open request message from the upstream adapter modules 305, the IO module 301 compares the globally unique concurrent connection serial number in the second open request message received with the concurrent connection serial number from the first open request message that has been saved in the per concurrent connection control data structure. When the concurrent connection serial number matches a previously stored serial number, the IO module 310 identifies this message as a redundant message, and the IO module 310 will join the second connection open request message to the already open concurrent connection by adding the second sender information to the saved information in the per concurrent connection control data structure. The IO module 310 will use the resources already allocated for the upstream per hop connection to the first adapter module 305 and will mark the hop path from second upstream adapter as open. The IO module 310 will then send a concurrent connection open response message with a success status to the second upstream adapter module 305 from which it received the connection open request over the backplane on the remote chassis.

When an upstream adapter module 305 receives the first concurrent connection open response message with a success status from a first of the two downstream IO modules 310, the adapter module 305 will mark the concurrent connection status as open and will mark the hop path from that downstream IO module 310 as open. The adapter module 305 will then, in turn, send a concurrent connection open response message with a success status to both upstream bridge modules 320 over the network infrastructure. When the adapter module 305 receives the second concurrent connection open response message with a success status from the second downstream IO module 310, the adapter module 305 will mark the hop path from that downstream IO module 310 as open.

When an upstream bridge module 320 receives the first concurrent connection open response message with a success status from a first of the two downstream adapter modules 305, the bridge module 320 will mark the concurrent connection status as open and will mark the hop path from that downstream adapter module 305 as open. The bridge module 320 will then, in turn, send a concurrent open response message with a success status to the upstream controller, over the backplane within the respective chassis. When the bridge module 320 receives the second concurrent connection open response message with a success status from the second downstream adapter module 305, the bridge module 320 will mark the hop path from that downstream adapter module 305 as open.

When an upstream controller 300 receives a concurrent connection open response message with a success status from a downstream bridge module 320, the controller 300 will mark the concurrent connection status as open and will mark the hop path from that downstream bridge module 320 as open. The concurrent connection is thus now open and is ready to transfer data.

FIG. 13 shows the message flow model for a concurrent connection open process in another exemplary HA control system for a single concurrent connection. It should be noted that FIG. 13 only shows message flow and not all physical arrangements such as network infrastructure, backplanes, and the like. In the embodiment shown in FIG. 13, the two controllers 315, Controller A 315A and Controller B 315B, are in single chassis redundancy mode. The two controllers are capable of directly communicating with each other via a backplane and directly communicating with the adapter modules 305 on the network rather than utilizing bridge modules. The rest of the HA control system is configured similar to the one shown in FIG. 11 and described above. The two controllers 315 are connection originators and are establishing a concurrent connection with the two IO modules 310, which are connection targets during the concurrent connection open process. In this embodiment, the controllers 315 will directly send a concurrent connection open request message to each of the two adapter modules 305 as the first hop. The connection open process proceeds in same way to the IO Modules 310 and back as described earlier with respect to FIG. 11 except that a concurrent connection open response message will be sent directly from the adapter modules 305 to the controllers 315. When an upstream controller 315 receives a first concurrent connection open response message with a success status from one of the downstream adapter modules 305, it will mark the concurrent connection status as open and will mark the hop path from that downstream adapter module as open. When an upstream controller 315 receives a second concurrent connection open response message with a success status from the other of the downstream adapter modules 305, it will mark the hop path from that downstream adapter module as open. The concurrent connection is thus now open and is ready to transfer data.

When a module receiving the concurrent connection open request cannot allocate resources for the request or cannot open the connection for any other reason, the module at which the concurrent connection open request failed will send a concurrent connection open response message with a failure status to the upstream module that sent the concurrent connection open request message. When an upstream module receives a concurrent connection open response message with a failure status from a downstream module, it will mark the hop path from that downstream module as failed.

All modules start a concurrent connection open request message timer with an appropriate timeout duration when they send a concurrent connection open request message to another module along a hop path. If a concurrent connection response message is not received from the downstream module with either a success or a failure status, the request message timer on the upstream module that sent the open request message will eventually time out. The upstream module will then mark the hop path from that downstream module as failed.

When a module identifies that all downstream hop paths for a concurrent connection are marked as failed, it will send concurrent connection open response message with a failure status to all of its immediate upstream modules. The module that identified the failed downstream hop paths will then close the concurrent connection, free the allocated resources, and delete all information stored in the per concurrent connection data structure for the failed concurrent connection. When per hop connections are open on at least one path between each end of the concurrent connection, the concurrent connection will stay open. As long as the concurrent connection is open, it is the responsibility of an upstream module to periodically try to open a per hop connection on a failed or closed hop path using the saved connection parameters. When a concurrent connection is not open it is the responsibility of a controller to periodically try to open a concurrent connection using the saved connection parameters.

Figure 14:
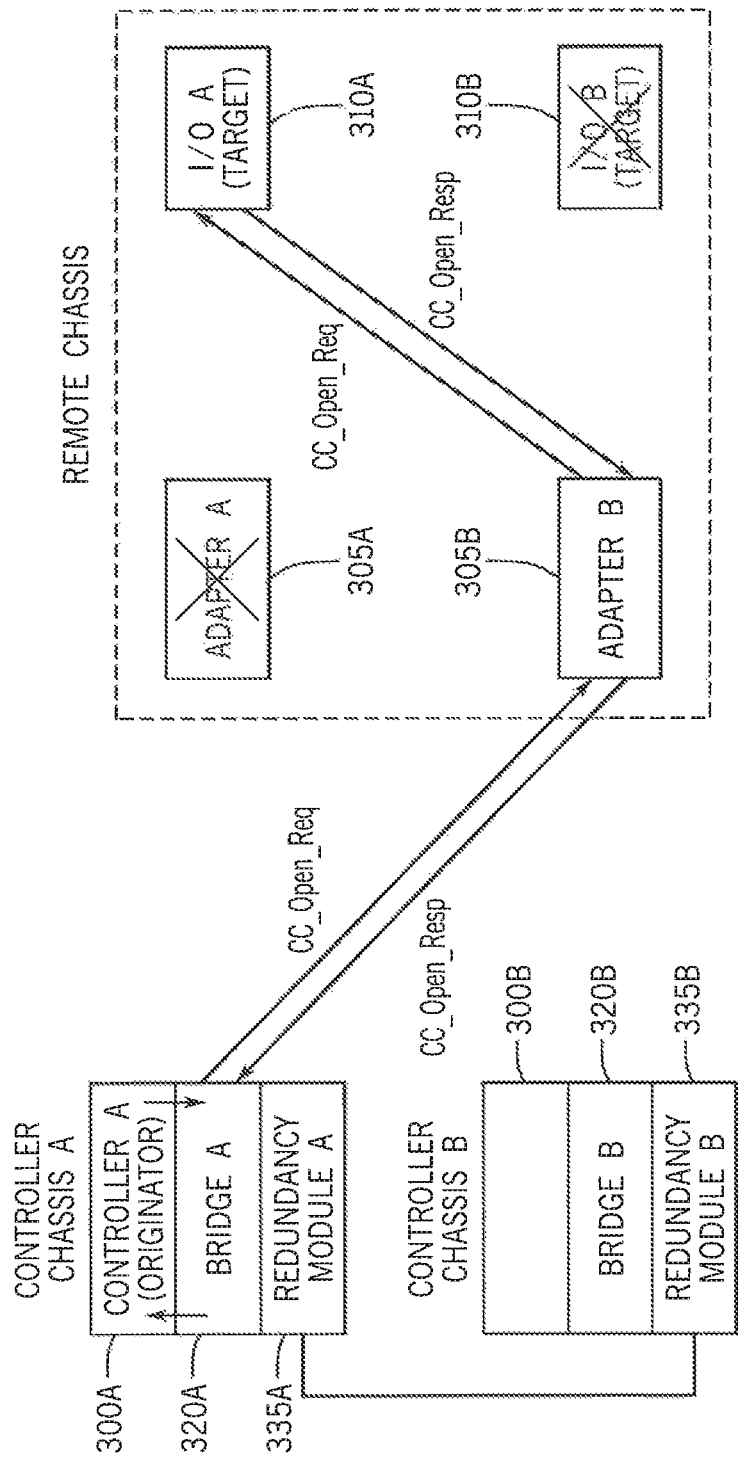
FIG. 14 is a flow diagram illustrating message flow between modules for a concurrent connection open process in the exemplary high availability control system of FIG. 11 when a portion of the modules have failed or are missing.

Turning next to FIG. 14, a message flow model of an exemplary concurrent connection open request message is shown in a HA control system with multiple failures. The HA control system illustrated in FIG. 14 is identical to the system illustrated in FIG. 11; however, Controller B 300B, Adapter A 305A, IO module B 310B have either failed or are not present during the concurrent connection open process. The concurrent connection open process proceeds as described above with respect to FIG. 11 with some changes to accommodate the failed modules, which will now be described.

In the absence of Controller B 300B, Controller A 300A will generate a globally unique concurrent connection serial number for a concurrent connection by itself and will provide the unique serial number to Controller B 300B when it comes online later. Because Controller B 300B is absent or has failed, the concurrent connection open request message will not be sent from Controller B to Bridge B 320B or to any other downstream paths from the absent controller B. Similarly, since Adapter A 305A is absent, it will not send the concurrent connection open request messages to either of the two downstream IO modules 310. While Bridge A 320A will send the concurrent connection open request messages to each of the two adapter modules 305, Bridge A 320A will not receive a concurrent connection open response message from Adapter A 305A because the adapter module is absent. Similarly, Adapter B 305B will send the concurrent connection open request messages to each of the two IO modules 310, but Adapter B 305B will not receive a concurrent connection open response message from the absent IO module B 310B. Eventually the concurrent connection open request message timer, described above, on Bridge A 320A and Adapter B 305B will generate a timeout indication for the hop paths they attempted to establish but for which the concurrent response message is not received. This will result in Bridge A 320A and Adapter B 305B marking those hop paths as failed. However, the concurrent connection open response message with a success status will be received by Adapter B 305B from IO module A 310A, by Bridge A 320A from Adapter B 305B, and by Controller A 300A from Bridge A 320A, resulting in those per hop connections to be open. The concurrent connection is able to open on one active path between the originator and the target and is ready to transfer data. When any of the missing modules come online later, the upstream modules will retry opening the per hop connections to the immediate downstream modules as described earlier, and these per hop connections will be added to the existing concurrent connection. As individual modules and the resulting per hop paths are restored, additional paths of the concurrent connection become active.

Though the description with respect to FIG. 14 focused only on module failures, communication failure due to faults in network infrastructure 70 and backplanes will also result in similar behavior since the concurrent connection open request message will not reach a downstream module. To the module sending the concurrent connection open request, a failure in a module or a failure in the transmission medium will appear the same. A failure in the transmission medium appears as an absent module from either communication direction. For example, from a downstream module perspective, a failure in the transmission medium appears the same as when an upstream module is absent. Similarly, from an upstream module perspective the communication failure will look the same as when a downstream module is absent. Eventually the concurrent connection open request message timer described earlier will generate a timeout indication on an upstream module attempting to establish a hop path in which a concurrent response message is not received, and the upstream module will mark that hop path as failed.

Figure 15:
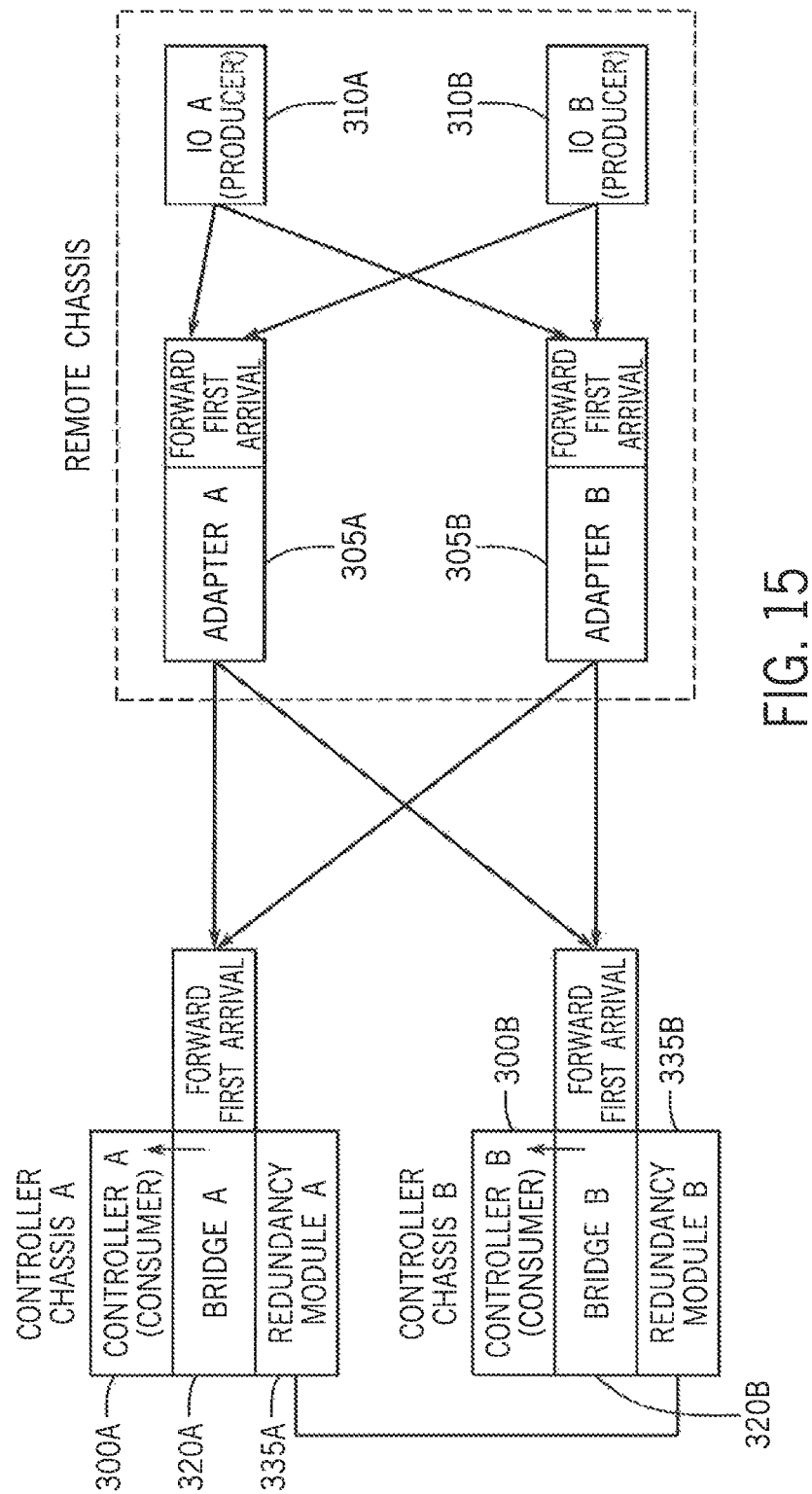
FIG. 15 is a flow diagram illustrating message flow in a first direction for modules in the high availability control system of FIG. 11 during run time operation utilizing a concurrent connection according to one embodiment of the invention.
Figures 16, 17:
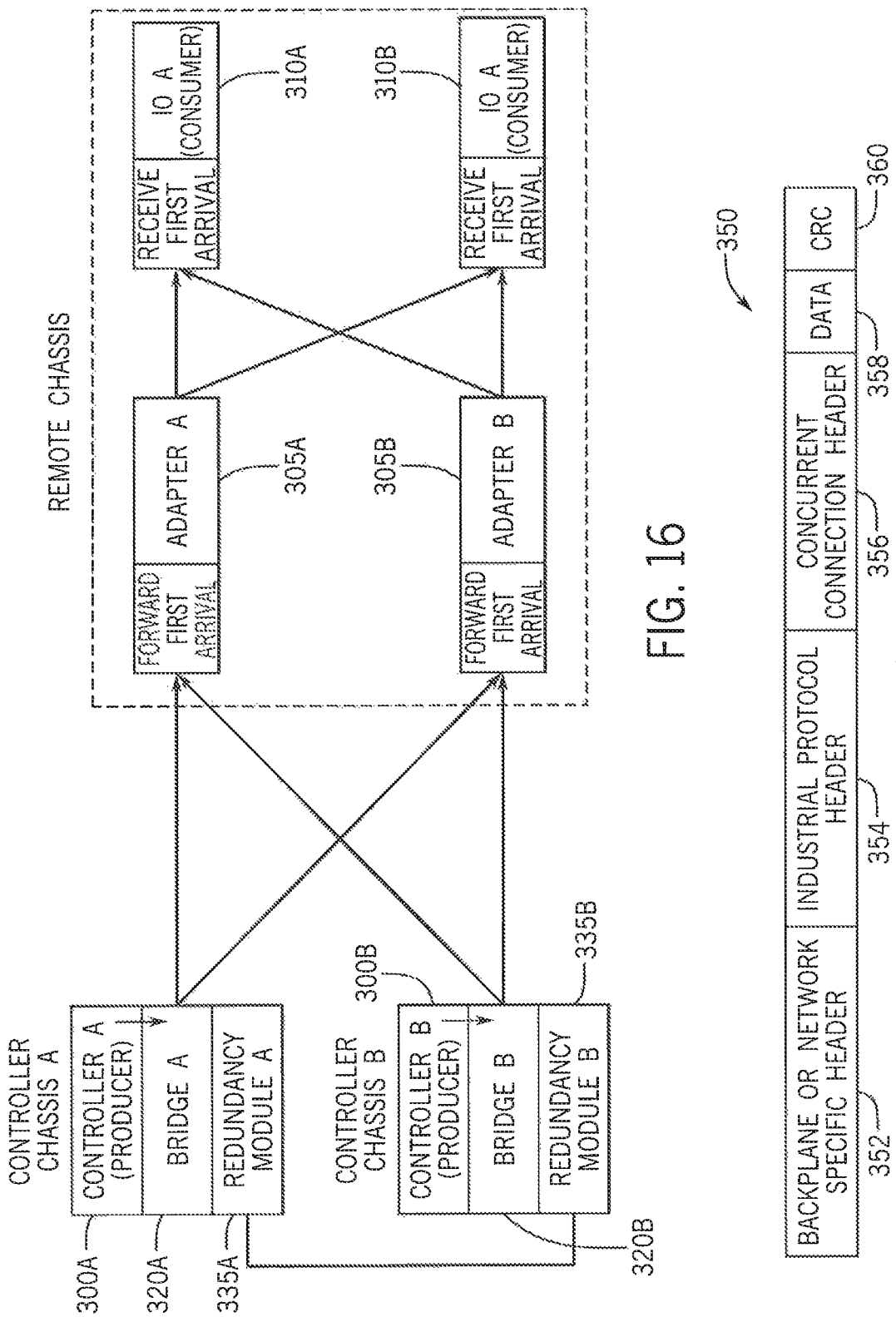
FIG. 16 is a flow diagram illustrating message flow in a second direction for modules in the high availability control system of FIG. 11 during run time operation utilizing a concurrent connection according to one embodiment of the invention, where the second direction is opposite the direction shown in FIG. 15.
FIG. 17 is a block diagram representation of an extended network segment format of a data message for use in a concurrent connection according to one embodiment of the invention.

The runtime behavior of concurrent connections will now be described. FIGS. 15 and 16 together show bidirectional data flow model in a single concurrent connection during runtime in a HA control system with dual chassis controller redundancy. FIG. 15 shows the HA control system discussed above with respect to FIG. 11 and further illustrates data flow to transfer input signals of controlled devices received at the input modules 310 to the controllers 300 in one direction of the concurrent connection previously opened. FIG. 16 shows data flow from the controllers 300 to transfer output signals for controlled devices to the IO modules 310 in the other direction of the concurrent connection. It should be noted that FIGS. 15 and 16 only show data flow and not all physical arrangements such as the network infrastructure, backplanes, and the like. FIG. 15 shows the IO modules 310 acting as data producers and the controllers 300 acting as data consumers for data flow in one direction, and FIG. 10 shows the controllers 300 acting as data producers and the IO modules 310 acting as data consumers for data flow in the other direction. For discussion herein, it will be assumed that the concurrent connection type is cyclical, meaning data will be produced by both the IO modules 310 and the controllers 300 at periodical intervals for transmission in both directions.

It should be noted that in following description for the data flow model discussed with respect to runtime operation the terms upstream and downstream are used with respect to the direction of data flow from a producer to a consumer and will not always match with use of those terms in the concurrent connection open process from an originator to a target as discussed above. Referring now to FIG. 15, for every data production cycle, an IO application layer task executing on each of the redundant IO modules 310, IO module A 310A and IO module B 310B, on the remote chassis will sample input signals from the controlled devices. The IO application layer task executing on each of the redundant IO modules 310 will then exchange sampled input data with each other and reach an agreement on data to produce and an associated data sequence number to use during the current data production cycle. The IO application layer task in each redundant IO module 310 will then provide the same agreed upon data and sequence number to a concurrent connection layer executing on the redundant IO module 310 along with the unique concurrent connection identifier for data production. The concurrent connection layer on a redundant IO module 310 will use the unique concurrent connection identifier for each concurrent connection to find the per concurrent connection control data structure stored on that module.

The concurrent connection layer will then build a concurrent connection data packet for the given concurrent connection and send it to downstream adapter modules 305, Adapter A 305A and Adapter B 305B, over the backplane in the remote chassis. FIG. 17 shows the format of a concurrent connection data packet 350 according to one embodiment of the invention. The concurrent connection data packet 350 contains one or more backplane or network specific header(s) 352, as required for the communication medium on which the data packet 350 is to be transmitted, followed by an industrial protocol header 354, which includes information such as the packet type, a hop connection identifier, and the like. The protocol header 354 is followed by a concurrent connection header 356, data 358, and, lastly, a packet CRC 360. The concurrent connection header 356 includes information such as the unique concurrent connection serial number, the data sequence number generated by the application layer task, and a separate CRC determined as a function of the data in the concurrent connection header 356 and the data payload 358. This separate CRC in the concurrent connection header is used to ensure integrity of the concurrent connection header and the data from producer to consumer. The final, packet CRC 360 is used during communication on a network or a backplane on a hop-by-hop basis.

Referring back to FIG. 15, when an adapter module 305 receives a concurrent connection data packet 350 from an upstream IO module 310 over the backplane, the adapter module 305 will verify the separate CRC present in the concurrent connection header 356 is valid. If the CRC check on the separate CRC fails, the adapter module 305 will drop the concurrent connection data packet 350. If the separate CRC check passes, then the adapter module 305 will use the hop connection identifier and concurrent connection serial number in the data packet 350 to identify the hop connection from which it received the data packet and the corresponding per concurrent connection control data structure stored on the adapter module 305. The adapter module 305 will then check if the data sequence number in the data packet 350 is newer than a value of a data sequence number stored in the concurrent connection control data structure. If the sequence number is a duplicate to the stored value or is older than the stored value, the adapter module 305 will drop the data packet 350. If the sequence number is newer than the prior stored value, the adapter module 305 will store that the new sequence number in the concurrent connection control data structure, and build data packets for transmission to each of the two downstream bridge modules 320 over the network.

This procedure defines a forward first arrival scheme for the adapter module 305. In other words, the adapter module 305 will only forward the first concurrent connection data packet 350 received from each IO module with the same data. The adapter module 305 is indifferent whether the data packet 350 is received from IO Module A or IO Module B, but rather is only concerned that the first packet of the two packets is retransmitted to the next hop, while the second, or any additional redundant data packets are dropped.

When a bridge module 320 receives a concurrent connection data packet 350 from an upstream adapter module 305 over the network, the bridge module 320 will follow the same process as described above for the adapter modules 305 receiving a concurrent connection data packet from the IO modules 310. If all checks pass in the bridge module 320, then the bridge module 320 will, in turn, build and send concurrent connection data packets to the downstream controller 300, over the backplane in the local chassis.

When a controller module 300 receives a concurrent connection data packet 350 from an upstream bridge module 320, the controller module 300 will follow the same process as described above for receiving a concurrent connection data packet from an upstream module. If all checks pass, then the controller module 300 will provide the data and sequence number to an application layer task executing in the controller 300. The application layer tasks in each of the two controllers 300 will exchange the data and sequence number received by one controller with the other controller and will arrive at an agreed upon input data to use for a user control program executing on the controller 300.

The user control program is executing on each controller 300 and produces output data to send to the IO Modules 310. The application layer tasks executing in each of the two controllers 300 will exchange the output data produced on each controller with the other controller and will arrive at agreed upon output data and a sequence number for the output data to send to the IO Modules 310. The application layer task in each redundant controller 300 will then provide the same agreed upon data and sequence number to the concurrent connection layer along with the unique concurrent connection identifier for the concurrent connection by which the output data is to be transmitted to the IO Modules 310.

With reference next to FIG. 16, a concurrent connection data packet will be generated and transmitted from the controllers 300 as producers to the IO Modules 310 as consumers in a manner similar to that described above for the reverse direction of data transfer shown in FIG. 15. The concurrent connection layer on a redundant controller module will use the unique concurrent connection identifier to find the per concurrent connection control data structure stored on that module build a concurrent connection data packet 350 for the given concurrent connection, and send the data packet to the downstream bridge modules 320 over backplane. When a bridge module 320 receives a concurrent connection data packet 350 from upstream controller 300, the bridge module 320 will follow the same process as described above for the forward first arrival scheme, accepting the first concurrent connection data packet 350 with a particular sequence number and dropping any redundant data packet. If all checks pass, then the bridge module 320 will build and send concurrent connection data packets to each of the two downstream adapter modules 305 over the network. When an adapter module 305 receives a concurrent connection data packet from an upstream bridge module 320 over the network, the adapter module 305 will also follow the forward first arrival scheme, accepting the first concurrent connection data packet 350 with a particular sequence number and dropping any redundant data packet. If all checks pass, then the adapter module 305 will build and send concurrent connection data packets to each of the two downstream IO modules 310 over the backplane. When an IO module 310 receives a concurrent connection data packet from an upstream adapter module 305 over the backplane, the IO module 310 will similarly follow the receive first arrival scheme, accepting the first concurrent connection data packet 350 with a particular sequence number and dropping any redundant data packet. If all checks pass, then each IO Module 310 will provide the data and sequence number to an application layer task executing in the IO module. The application layer tasks in each IO module 310 will exchange the data and sequence number received at that IO module with the data and sequence number received at the other IO module and will arrive at agreed upon output data to use for providing output signals to each of the controlled devices. The application layer tasks in each of the redundant IO modules 310 will then apply the agreed upon output data to terminals o the IO modules as output signals to control operation of the controlled devices. Thus, the process of bidirectional data transfer is carried out for each production cycle.

Figure 18:
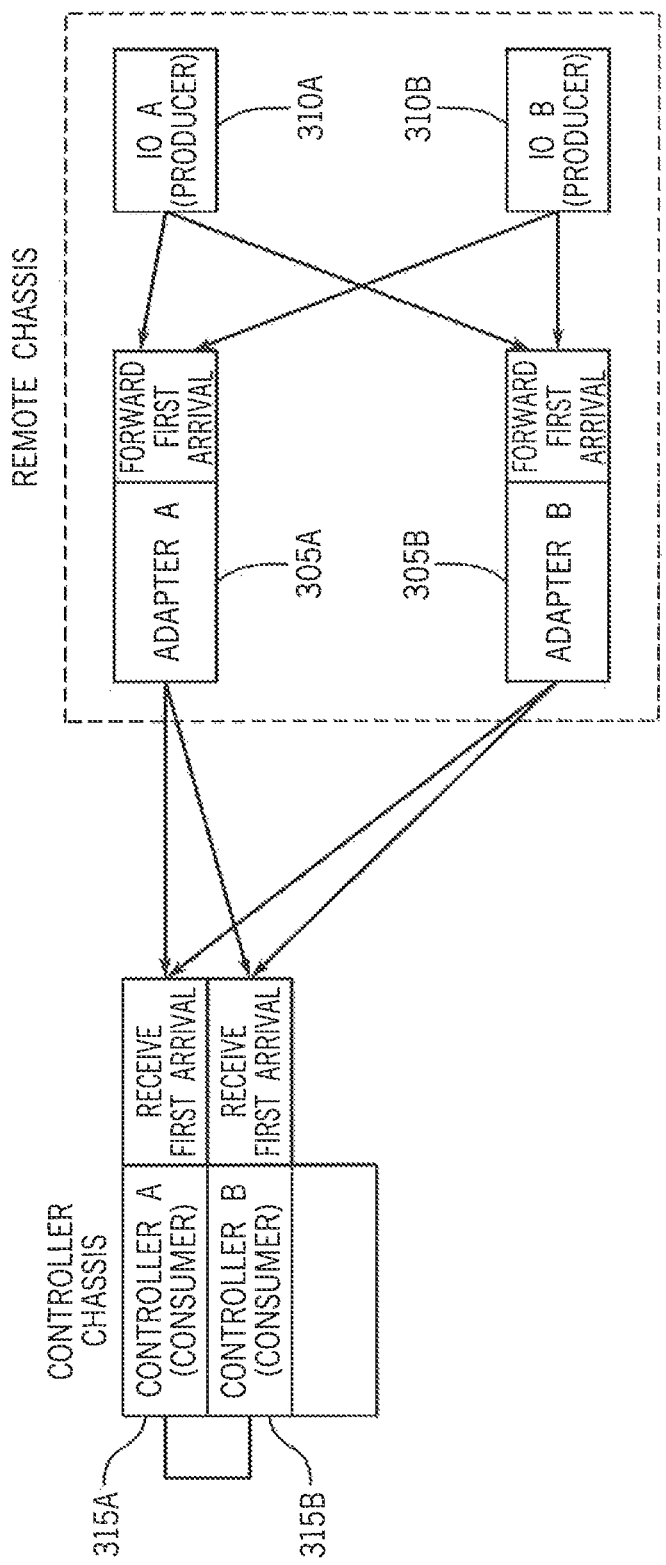
FIG. 18 is a flow diagram illustrating message flow in a first direction for modules in the high availability control system of FIG. 13 during run time operation utilizing a concurrent connection according to one embodiment of the invention.
Figure 19:
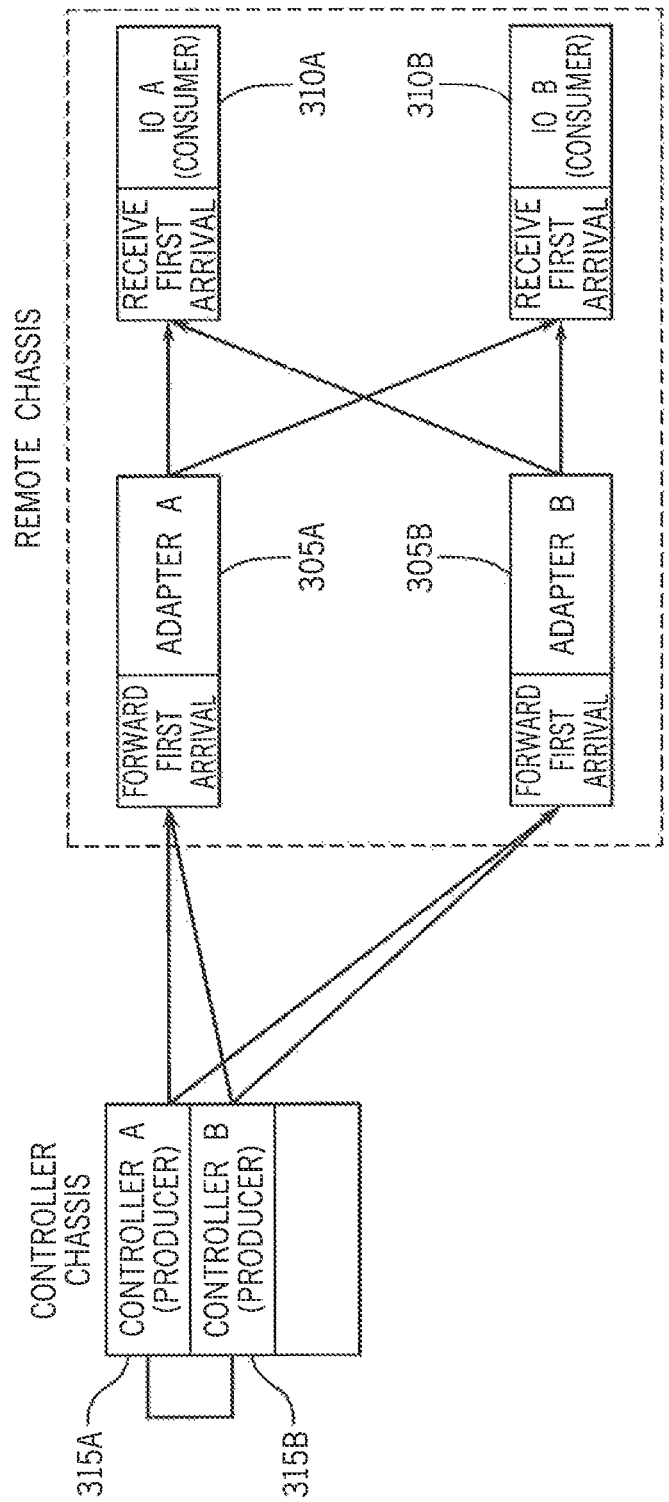
FIG. 19 is a flow diagram illustrating message flow in a second direction for modules in the high availability control system of FIG. 13 during run time operation utilizing a concurrent connection according to one embodiment of the invention, where the second direction is opposite the direction shown in FIG. 18.

FIGS. 18 and 19 together show bidirectional data flow model in a single concurrent connection during runtime in the HA control system with single chassis controller redundancy previously discussed in FIG. 13. FIG. 18 shows data flow from IO Modules 310 receiving input signals of controlled devices to controllers 315 in one direction and FIG. 19 shows data flow from controllers 315 providing output signals to the IO Modules 310 to control operation of the controlled devices in the other direction. It should be noted that FIGS. 18 and 19 only show data flow and not all physical arrangements such as the network infrastructure, backplanes, and the like. FIG. 18 shows the IO modules 310 acting as data producers and the controllers 315 acting as data consumers for data flow in one direction. FIG. 19 shows the controllers 315 acting as data producers and the IO modules 310 acting as data consumers for data flow in the other direction. The bidirectional data transfer process proceeds in the same manner as described above for the dual chassis redundancy case illustrated in FIGS. 15 and 16. In this embodiment, controllers 315 directly transmit concurrent connection data packets 350 to or receive the data packets from adapter modules 305 over the network. Otherwise, the process of bidirectional data transfer is carried out for each production cycle in the same manner as dual chassis redundancy case.

All modules use a per hop connection receive timer to monitor data packet reception from an upstream module on an open per hop connection. This timer is started when a per hop connection is first opened. The timer executes with a connection timeout duration that is received as part of connection parameters. Whenever a valid concurrent connection data packet is received on a per hop connection, the per hop connection receive timer is restarted. When a valid concurrent connection data packet is not received on a per hop connection for a time equal to or greater than the connection timeout duration, the per hop connection timer will generate a time out event and the module executing the timer marks that per hop connection as closed. As described earlier it is the responsibility of an upstream module (from the perspective of the concurrent connection open process) to periodically try to reopen closed per hop connections. When a module identifies that all per hop connections from upstream modules are marked as closed, then it will close the concurrent connection, free the resources allocated for it, and delete all information stored in the per concurrent connection data structure.

Figure 20:
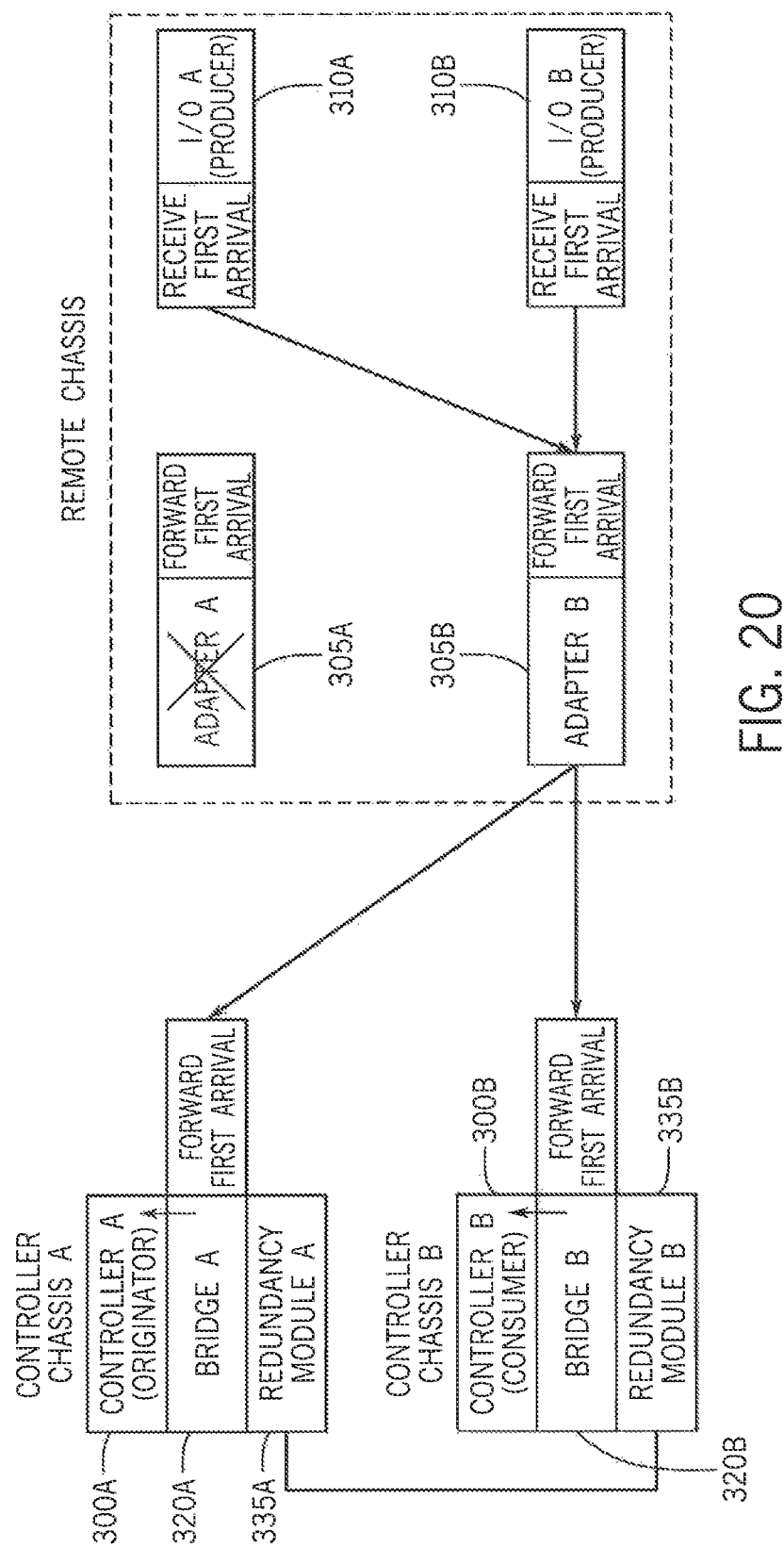
FIG. 20 is a flow diagram illustrating message flow in the first direction for modules in the high availability control system of FIG. 15 during run time operation utilizing a concurrent connection according to one embodiment of the invention with one of the adapter modules failed or removed.
Figure 21:
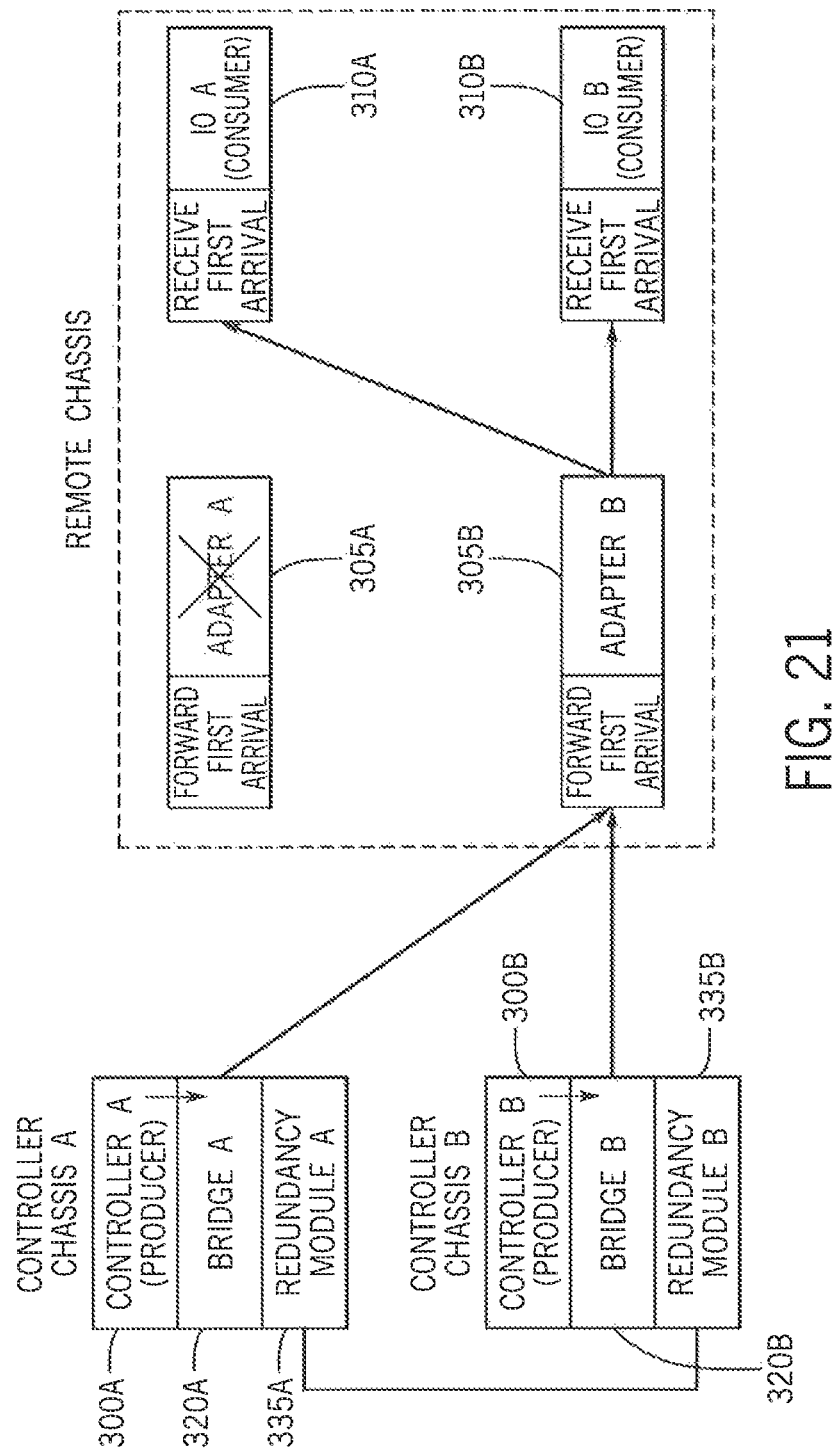
FIG. 21 is a flow diagram illustrating message flow in the second direction for modules in the high availability control system of FIG. 16 during run time operation utilizing a concurrent connection according to one embodiment of the invention with one of the adapter modules failed or removed.

FIGS. 20 and 21 show the same data flow model for a dual chassis redundancy HA control system as shown and discussed above with respect to FIGS. 15 and 16 except with the addition of a runtime fault in Adapter A 305A. Referring now to FIG. 20, when Adapter A 305A fails during runtime, the per hop connection receive timer on Bridge A 320A for concurrent connection data packets received via the per hop connection from adapter A 305A will timeout due to non-reception of the concurrent connection data packets from adapter A, and Bridge A 320A will close the per hop connection to Adapter A 305A. Similarly, Bridge B 320B will also experience a timeout on the per hop connection receive timer for concurrent connection data packets received from Adapter A 305A via its respective per hop connection and close the per hop connection to adapter A. Referring now to FIG. 21, IO module A 310A and IO module B 310B will similarly experience timeouts on their respective per hop connection receive timers for concurrent connection data packets received from Adapter A 305A in the other communication direction and close their respective per hop connections to Adapter A. Since Bridge A 320A and Bridge B 320B closed their respective per hop connections to Adapter A 305A, each bridge module 320 will stop sending data packets to Adapter A 305A. Similarly, since IO module A 310A and IO module B 310B closed their respective per hop connections to Adapter A, 305A each IO module 310 will stop sending data packets to Adapter A. The concurrent connection will, however, remain open and continue bidirectional data transfer through the remaining per hop paths. When Adapter A 305A comes back online, Bridge A 320A and Bridge B 320B will each reopen their respective per hop connection paths to Adapter A 305A via a concurrent connection open request. Successfully re-establishing the per hop connections between the bridge modules 320 and Adapter A 305A will, in turn, cause Adapter A 305A to reopen per hop connections to each of the IO modules 310, thus completing the recovery of concurrent connection.

Though the description above with respect to FIGS. 20 and 21 focused only on a module failure, communication failure due to faults in network infrastructure and backplanes will result in similar behavior. The modules affected by communication failure between them will experience a timeout in a per hop connection receive timer and will close the per hop connection to a module on the other side of the communication failure. The concurrent connection will continue to stay open and carrying out bidirectional data transfer through remaining per hop paths. When the communication failure disappears the upstream module with respect to the concurrent connection request process will attempt to reestablish and reopen the hop connection completing the recovery of concurrent connection.

The concurrent connection close process is done on a hop-by-hop basis in a manner similar to the concurrent connection open process. The concurrent connection originator, usually a controller, starts the concurrent connection close process by sending a concurrent connection close request message to one or more downstream modules depending on number of open per hop connections to downstream modules. The controller will then close the concurrent connection, freeing the resources allocated for it and deleting all information stored in the per concurrent connection control data structure for that connection. An intermediate module receiving a concurrent connection close request message from an upstream module will send a concurrent connection close response message with a success status to the upstream module and will, in turn, close the per hop connection to that upstream module. If the closed per hop connection was the last open upstream per hop connection, the intermediate module will also send a concurrent connection close request message to one or more downstream modules depending on number of open per hop connections to the downstream modules. The intermediate module will then close the concurrent connection, freeing the resources allocated for it and deleting all information stored in the per concurrent connection control data structure for that connection. A concurrent connection target module receiving a concurrent connection close request message from an upstream module will send a concurrent connection close response message with a success status to the upstream module and will close the per hop connection to that upstream module. If the closed per hop connection was the last open upstream per hop connection, the target module will close the concurrent connection, freeing the resources allocated for it and deleting all information stored in the per concurrent connection control data structure for that connection.

Concurrent connection diagnostics are provided to help pinpoint problem location to user. When a per hop connection is closed on a module while the concurrent connection associated with that per hop connection is still open, a diagnostic bit will be set on the module status information. This module status information and hence the diagnostic bit is readily available to a user control program executing in the controller and to raise an alarm on an HMI when a fault is detected. Additional information about closed hop connections of concurrent connections can be obtained from a module programmatically through messages from the controller and via the HMI. Alternatively, this diagnostic information will also be available on module web pages.

Concurrent connections are fully compatible with functional safety such as those used in safety instrumented systems (SIS). Concurrent connections can carry safety data as data payload in black channel mode of operation for functional safety systems.

In yet another embodiment of communicating data over a high availability industrial control system, each controller in a redundant pair of controllers opens a connection using a set of rules to ensure that at least two open connections exist between a redundant target and source and that the two connections (or three connections for triple redundancy) between the redundant originators and the redundant targets use as divergent paths as possible. In the case of the system shown in FIG. 22, two controllers may attempt the connection open using the following paths listed in Table 2.

TABLE 2

Figure 22:
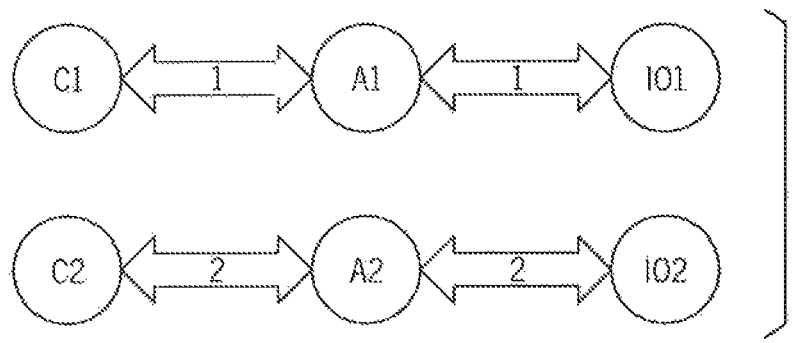
FIG. 22 is a block diagram representation of one embodiment of a dual redundancy system communicating data over an industrial control network in a high availability industrial control system according to another embodiment of the invention.

Exemplary connection paths in the HA control system of FIG. 22

| Controller 1 | Controller 2 |
|---|---|
| 1. C1 -> A1 -> IO1 | 1. C2 -> A2 -> IO2 |
| 2. C1 -> A1 -> IO2 | 2. C2 -> A2 -> IO1 |
| 3. C1 -> A2 -> IO1 | 3. C2 -> A1 -> IO2 |
| 4. C1 -> A2 -> IO2 | 4. C2 -> A1 -> IO1 |

Figure 23:
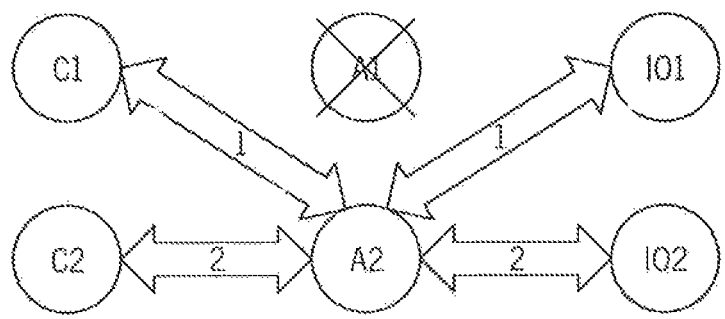
FIG. 23 is a block diagram representing the dual redundancy system of FIG. 22 with a single adapter module faulted.
Figure 24:
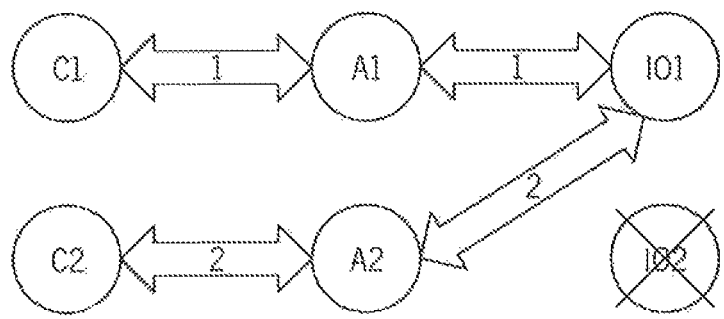
FIG. 24 is a block diagram representing the dual redundancy system of FIG. 22 with a single IO module faulted.

If there is a single fault on one of the path segments or devices, only one of the controllers will encounter the fault and the other one of the controllers, therefore, will successfully complete the connection open on the first try. Examples of a single fault occurring in different modules for the embodiment of FIG. 22 are illustrated in FIGS. 23 and 24. In FIG. 23, the adapter module in the first connection path is faulted, and in FIG. 24, the IO module in the second connection path is faulted. In FIG. 23, the second controller is successful in establishing a connection on the first try, and in FIG. 24, the first controller is successful in establishing a connection on the first try. While each of the controllers that failed on the first attempt are able to establish a redundant communication path in a subsequent connection open, there is no delay in the initial connection open, resulting in no performance loss at startup.

Figure 25:
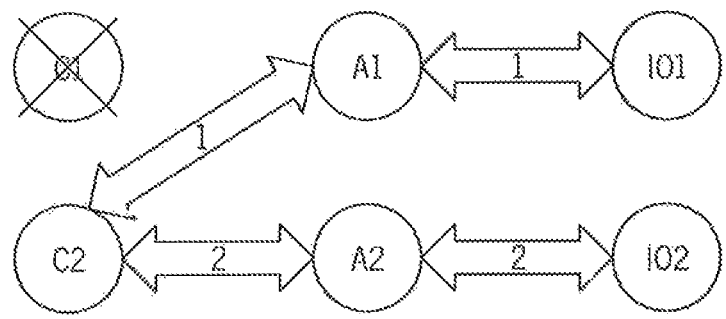
FIG. 25 is a block diagram representing the dual redundancy system of FIG. 22 with a single controller faulted.

If the controller is not part of redundant pair (or if its partner controller has faulted as shown in FIG. 25) the active controller will attempt to open two connections. A first connection open attempt is selected starting from the top of the connection list for that controller and the second connection open attempt is selected starting from the bottom of the list for that controller. With reference again to Table 2, the second controller in FIG. 25 establishes connections along the first and last connections in the connection list. As with the other embodiments of communicating data over a high availability industrial control system, this method allows communications to continue after multiple faults, provided faults do not occur on each component of a redundant pair.

When a controller detects a fault on its open connection, it will attempt to reopen the connection moving down its list of possible paths to find a working path. Provided this is the first fault, while the faulted controller is reopening its connection, the other controller's connection will remain open since they share no common components in their two paths. And while a controller is operating with a path other than its first choice, it will periodically retry the paths higher on its list to detect when a fault on the initial path is cleared.

Figure 26:
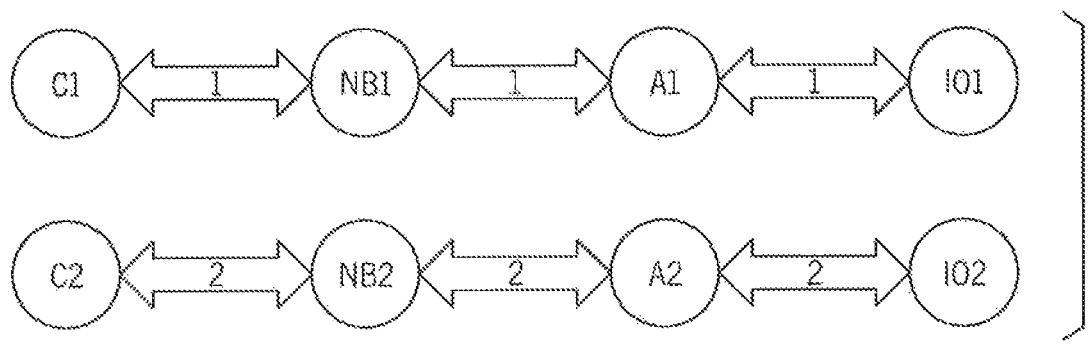
FIG. 26 is a block diagram representation of another embodiment of a dual redundancy system communicating data over an industrial control network in a high availability industrial control system according to another embodiment of the invention.
Figure 27:
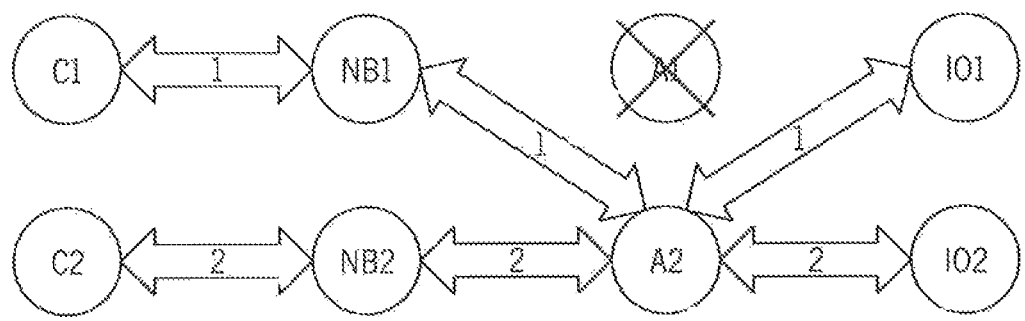
FIG. 27 is a block diagram representing the dual redundancy system of FIG. 26 with a single adapter module faulted.
Figure 28:
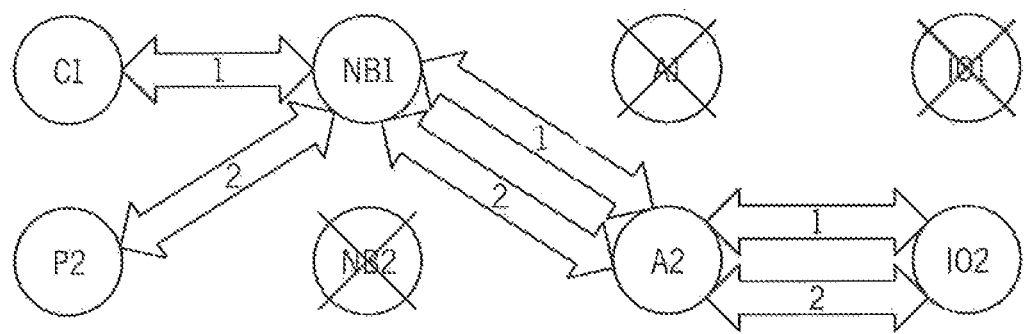
FIG. 28 is a block diagram representing the dual redundancy system of FIG. 26 with multiple modules faulted.
Figure 29:
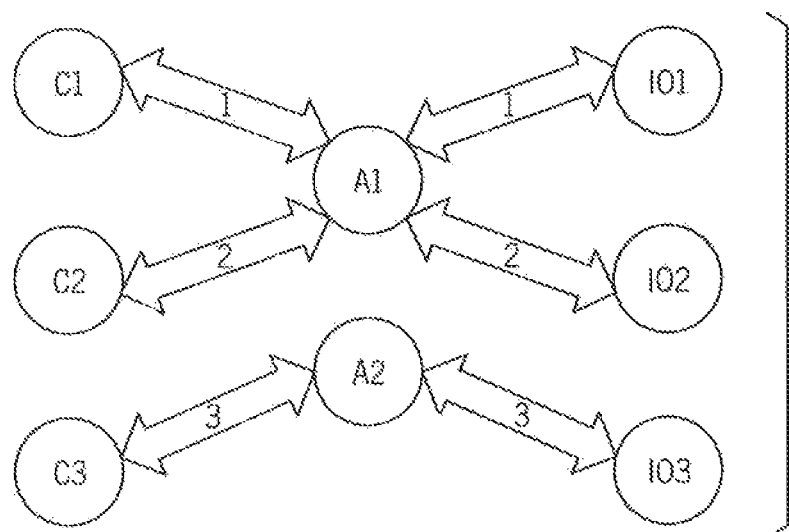
FIG. 29 is a block diagram representation of one embodiment of a partial triple redundancy system communicating data over an industrial control network in a high availability industrial control system according to another embodiment of the invention.

As with the other embodiments of communicating data over a high availability industrial control system, this method is extendable to additional layers of redundancy. FIGS. 26-28 show a system with redundant controllers, redundant network bridge modules, redundant adapters and redundant IO modules. In the case of the system illustrated in FIG. 26, each of the two controllers would attempt the connection open using the following table of potential connection paths. FIGS. 27 and 28 illustrate exemplary fault conditions that may occur in the system.

TABLE 3

Exemplary connection paths in the HA control system of FIG. 26

| Controller 1 | Controller 2 |
|---|---|
| 1. C1 -> NB1 -> A1 -> IO1 | 1. C2 -> NB2 -> A2 -> IO2 |
| 2. C1 -> NB1 -> A1 -> IO2 | 2. C2 -> NB2 -> A2 -> IO1 |
| 3. C1 -> NB1 -> A2 -> IO1 | 3. C2 -> NB2 -> A1 -> IO2 |
| 4. C1 -> NB1 -> A2 -> IO2 | 4. C2 -> NB2 -> A1 -> IO1 |
| 5. C1 -> NB2 -> A1 -> IO1 | 5. C2 -> NB1 -> A2 -> IO2 |
| 6. C1 -> NB2 -> A1 -> IO2 | 6. C2 -> NB1 -> A2 -> IO1 |
| 7. C1 -> NB2 -> A2 -> IO1 | 7. C2 -> NB1 -> A1 -> IO2 |
| 8. C1 -> NB2 -> A2 -> IO2 | 8. C2 -> NB1 -> A1 -> IO1 |

Turning next to FIGS. 29-34, a HA control system with partial triple redundancy is illustrated. The controllers and IO modules each exhibit triple redundancy (i.e., three modules) while the adapter modules only utilize parallel redundancy (i.e., two modules). Because the number of controllers and IO modules at each end of the connection exceeds the number of adapters at an intermediate point in the connection, at least two controllers and at least two IO modules must pass through one adapter, while the other controller and adapter may pass through the other adapter.

Figure 30:
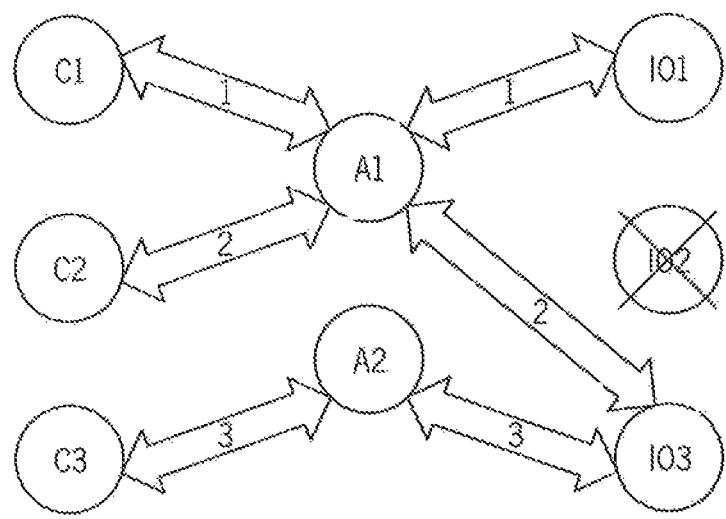
FIG. 30 is a block diagram representing the partial triple redundancy system of FIG. 29 with a single IO module faulted.
Figure 31:
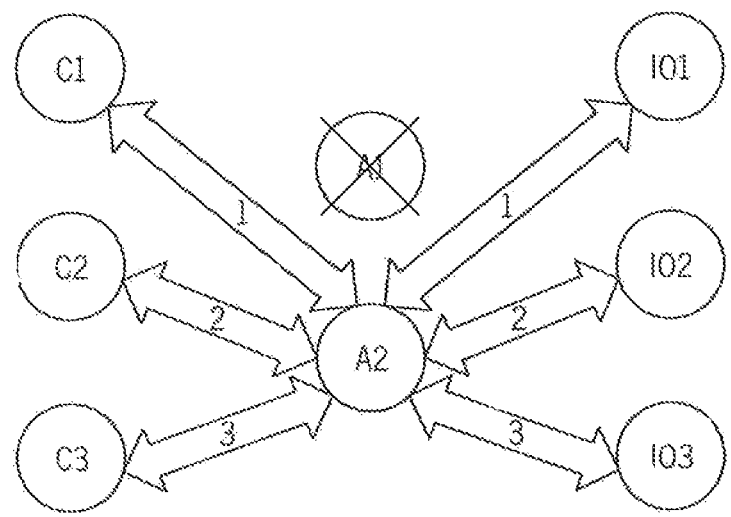
FIG. 31 is a block diagram representing the partial triple redundancy system of FIG. 29 with a single adapter module faulted.

In FIGS. 30 and 31 one of the redundant downstream modules in each path has failed. In FIG. 30, the second IO module has failed. Controller 2, therefore, fails in its first open connection, but Controllers 1 and 3 are successful. Controller 2 selects another path from its list and opens a new path to IO Module 3. In FIG. 31, the first adapter has failed. Controller 3 is still able to successfully open its initial path. Controllers 1 and 2 must select an alternate path. Because this stage of the system has only parallel redundancy, each of the controllers ends up establishing a path through Adapter 2.

Figure 32:
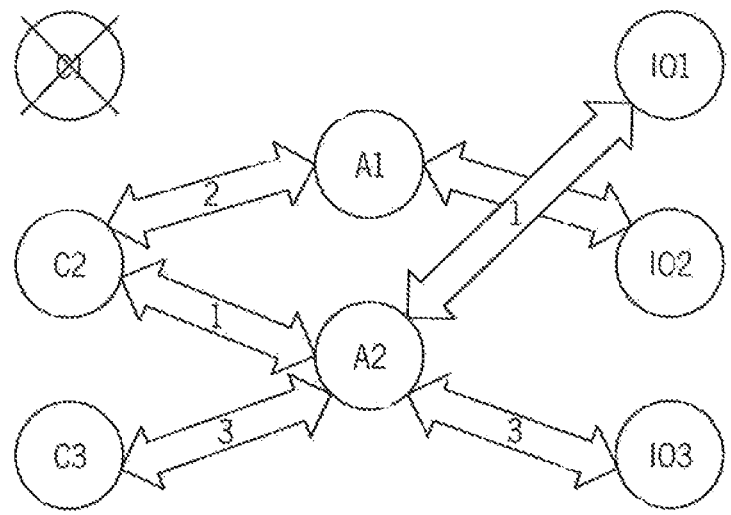
FIG. 32 is a block diagram representing the partial triple redundancy system of FIG. 29 with a first controller faulted.
Figure 33:
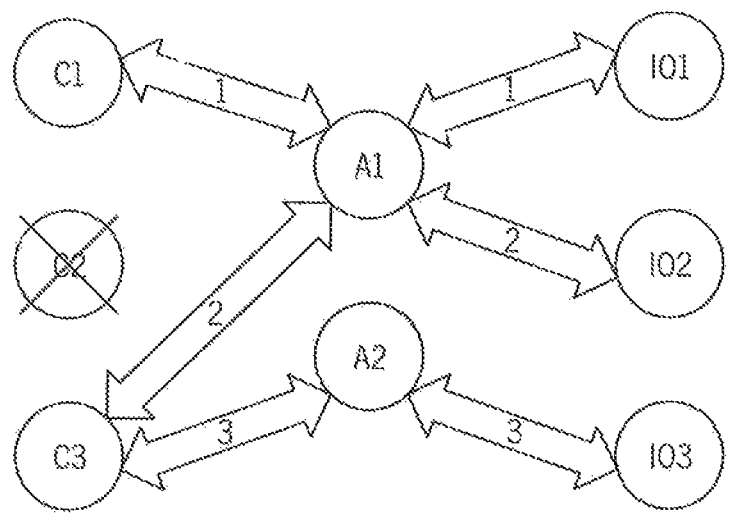
FIG. 33 is a block diagram representing the partial triple redundancy system of FIG. 29 with a second controller faulted.
Figure 34:
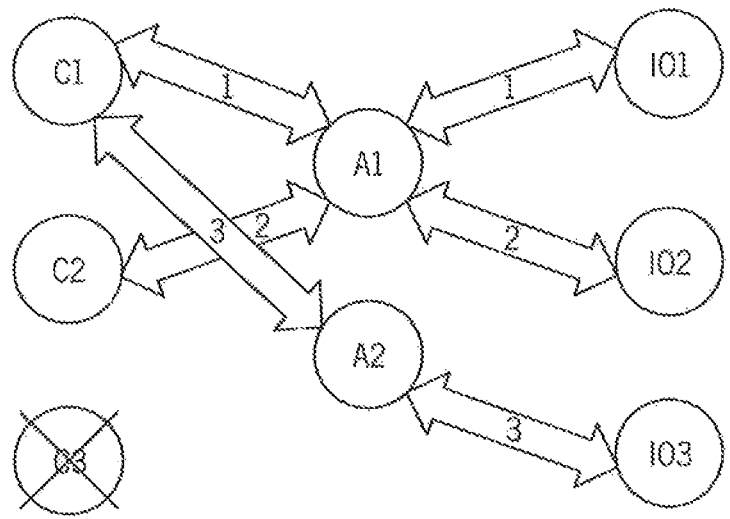
FIG. 34 is a block diagram representing the partial triple redundancy system of FIG. 29 with a third controller faulted.

Referring next to FIGS. 32-34, one of the controllers in the system has failed. If controller 1 fails, controller 2 opens a second connection starting at the bottom its list. If controller 2 fails, controller 3 opens a second connection starting at the bottom its list. And if controller 3 fails, controller 1 opens a second connection starting at the bottom its list. If two controllers fail, the remaining controller will open three connections.

Figure 35:
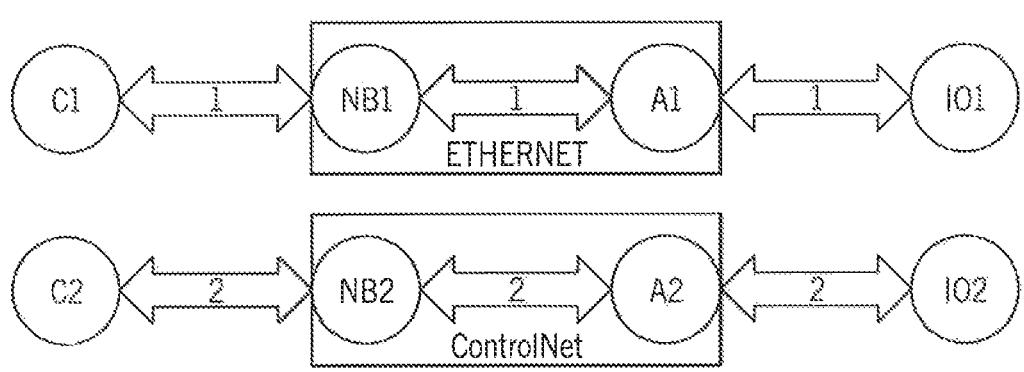
FIG. 35 is a block diagram representation of one embodiment of a system with redundant networks communicating data over an industrial control network in a high availability industrial control system according to another embodiment of the invention.
Figure 36:
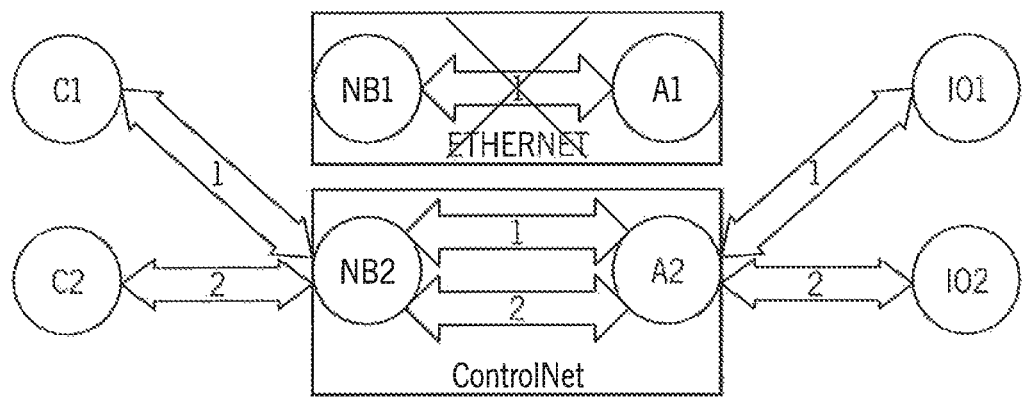
FIG. 36 is a block diagram representing the system with redundant networks of FIG. 35 with one network faulted.
Figure 37:
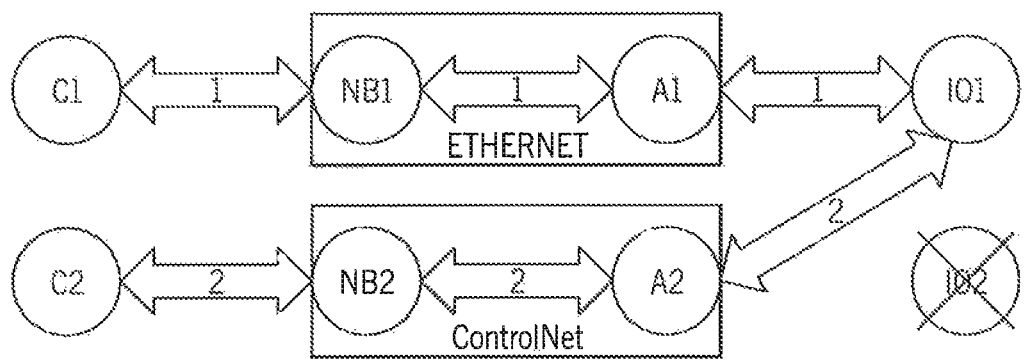
FIG. 37 is a block diagram representing the system with redundant networks of FIG. 35 with a single IO module faulted.
Figure 38:
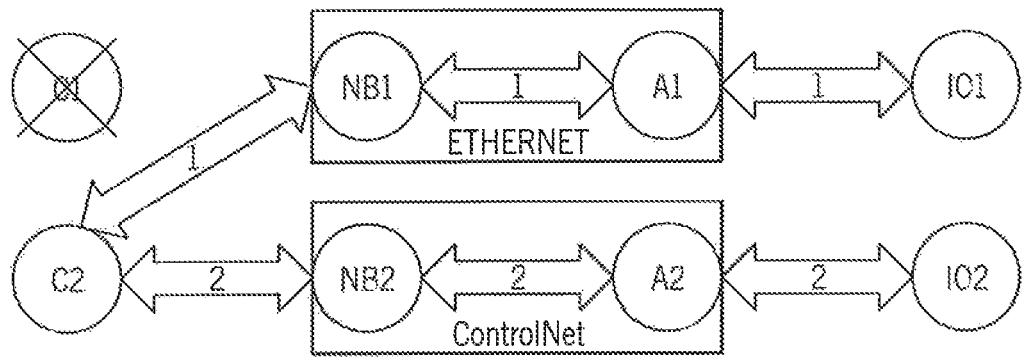
FIG. 38 is a block diagram representing the system with redundant networks of FIG. 35 with a single controller faulted.

It is also possible to setup a system using two totally independent networks. With reference next to FIG. 35, a HA control system using both an Ethernet network and a ControlNet network is illustrated. This system provides diversity while still maintaining the no-single-point-of-failure feature. FIGS. 36-38 illustrate the system of FIG. 35 in operation with redundant communication paths with a single fault in different modules. In the case of this HA control system, the controllers would attempt the connection open using the following table of connection paths.

TABLE 4

Exemplary connection paths in the HA control system of FIG. 35

| Controller 1 | Controller 2 |
|---|---|
| 1. C1 -> NB1 -> A1 -> IO1 | 1. C2 -> NB2 -> A2 -> IO2 |
| 2. C1 -> NB1 -> A1 -> IO2 | 2. C2 -> NB2 -> A2 -> IO1 |
| 3. C1 -> NB2 -> A2 -> IO1 | 3. C2 -> NB1 -> A1 -> IO2 |
| 4. C1 -> NB2 -> A2 -> IO2 | 4. C2 -> NB1 -> A1 -> IO1 |

Figure 39:
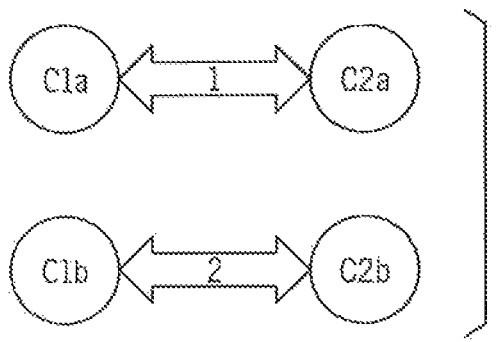
FIG. 39 is a block diagram illustrating redundant controllers for use in a high availability industrial control system.
Figure 40:
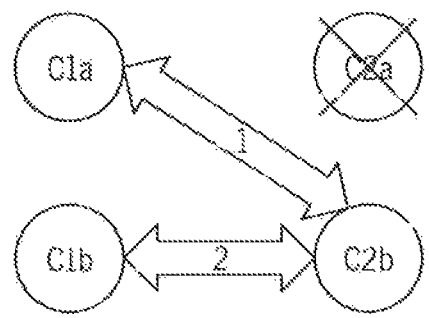
FIG. 40 is a block diagram representing the redundant controllers of FIG. 39 with a controller in one pair of controllers faulted.
Figure 41:
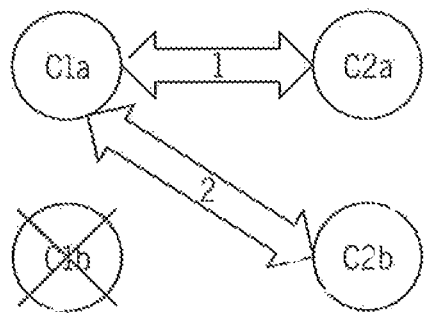
FIG. 41 is a block diagram representing the redundant controllers of FIG. 39 with a controller in the other pair of controllers faulted.
Figure 42:
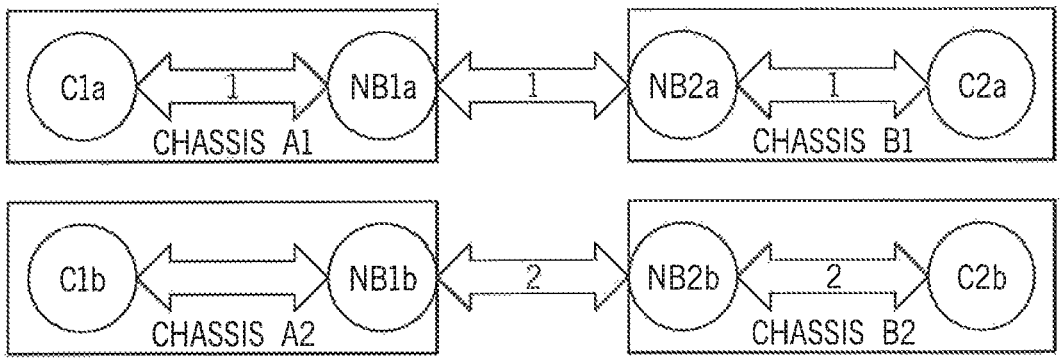
FIG. 42 is a block diagram illustrating redundant chassis for use in a high availability control system.
Figure 43:
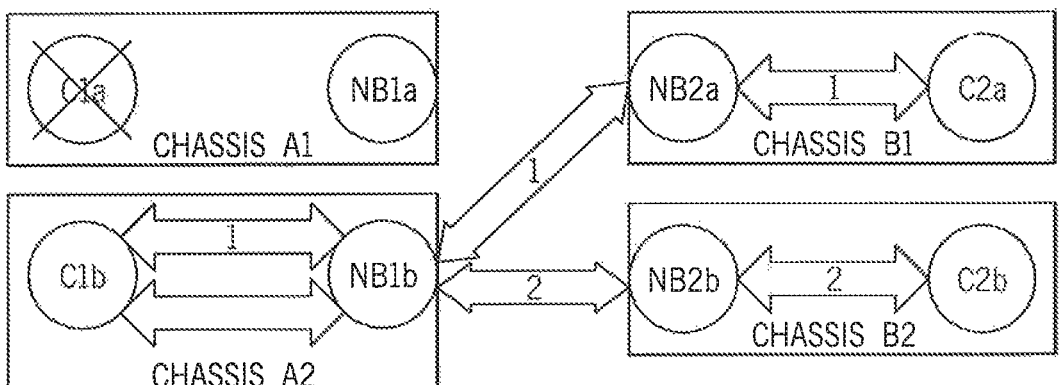
FIG. 43 is a block diagram representing the redundant chassis of FIG. 42 with one controller faulted.
Figure 44:
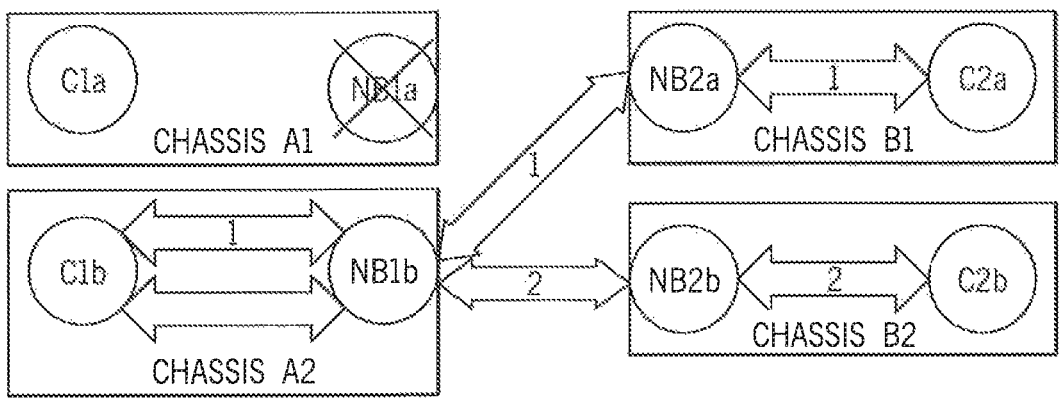
FIG. 44 is a block diagram representing the redundant chassis of FIG. 42 with one bridge module faulted.
Figure 45:
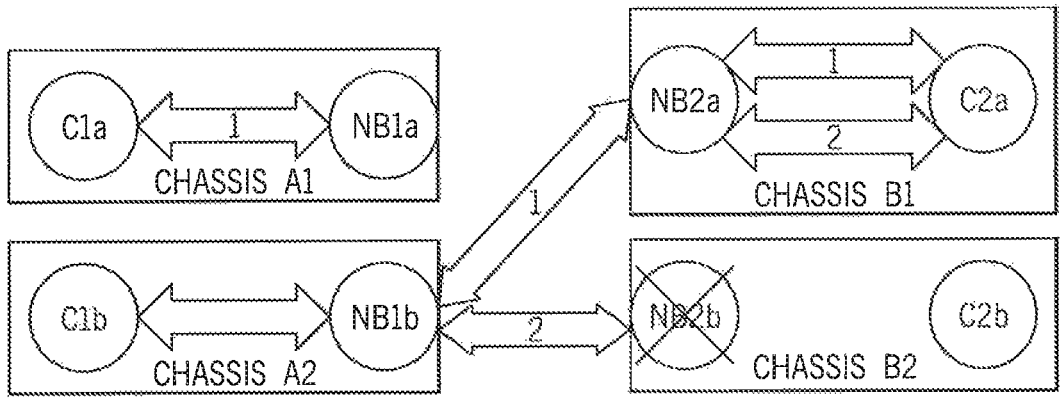
FIG. 45 is a block diagram representing the redundant chassis of FIG. 42 with a different controller faulted.
Figure 46:
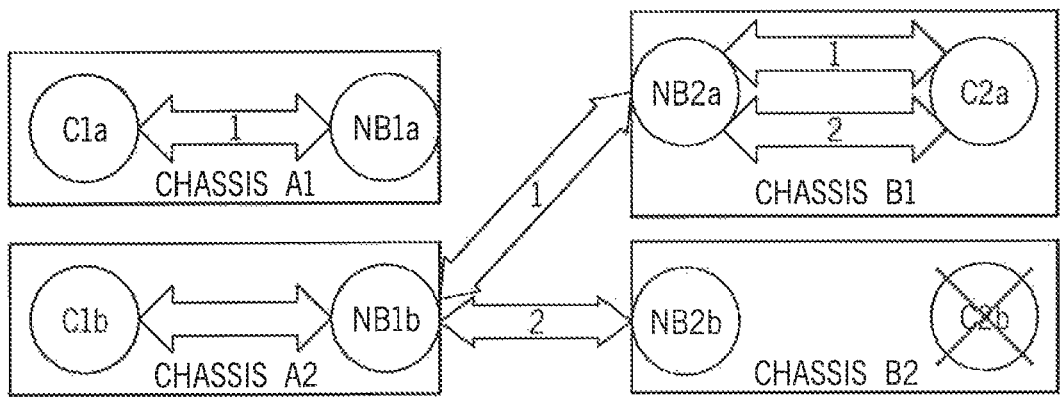
FIG. 46 is a block diagram representing the redundant chassis of FIG. 42 with a different bridge module faulted.
Figure 47:
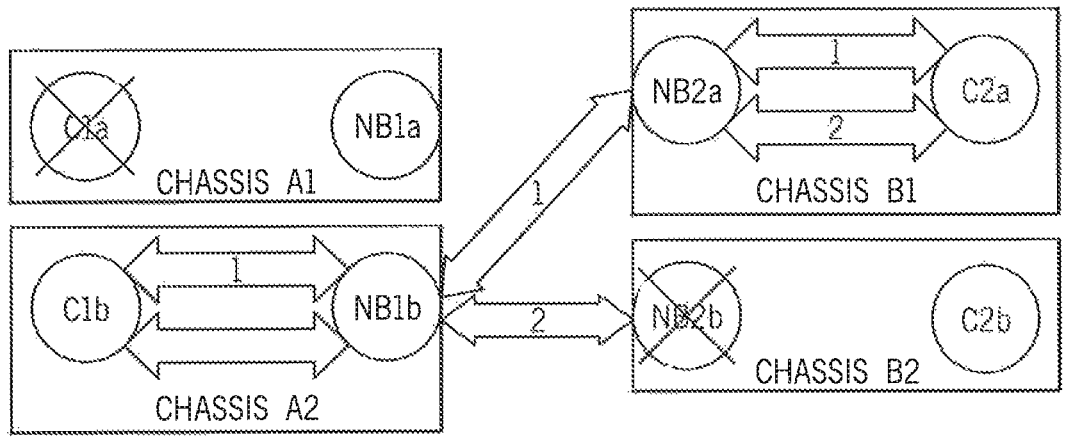
FIG. 47 is a block diagram representing the redundant chassis of FIG. 42 with a controller on one pair of controllers faulted and a bridge module on the other pair of controllers faulted.

While all the previous examples have been a controller (or set of controllers) communicating with IO modules, concurrent connections can also be used for controller to controller communications. Also, previous examples, which included network bridge modules, showed the controller redundancy and network bridge redundancy as independent (module level redundancy). FIGS. 39-41 show a pair of redundant Controllers (C1*a* & C1*b*) communicating with another pair of redundant Controllers (C2*a* & C2*b*). A similar system could be built using any combination of triple redundancy controllers, dual redundant controllers, and simplex controllers. In the case of this system, controllers would attempt the connection open using the following table of connection paths.

TABLE 5

Exemplary connection paths between the redundant controllers of FIG. 39

| Controller 1a | Controller 1b |
|---|---|
| 1. C1a -> C2a | 1. C1b -> C2b |
| 2. C1a -> C2b | 2. C1ab -> C2a |

Redundancy is not always done at the device level. Redundancy, especially controller redundancy, is often done at the chassis level. In this type of system, the controller is paired with the network bridge modules as shown in FIGS. 42-47. In the case of this system, controllers would attempt the connection open using the following table of connection paths.

TABLE 6

Exemplary connection paths between the redundant controllers of FIG. 39

| Controller 1a | Controller 1b |
|---|---|
| 1. C1a -> NB1a -> NB2a -> C2a | 1. C1b -> NB1b -> NB2b -> C2b |
| 2. C1a -> NB1a -> NB2b -> C2b | 2. C1b -> NB1b -> NB2a -> C2a |

Pairing a network bridge module with a controller has certain advantages. No special connection handling is required between the bridge and adapter modules. Only the end points are involved in the generating the two active paths and in handling the reception of two packets. As a result, the number of communication packets on the networks is reduced.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A system of communicating data over a high availability industrial control network, the system comprising:
a first module of an industrial control system having a processor operative to generate a first data packet for transmission, wherein the first data packet includes an identifier defining a connection for communication in the system;
a second module of the industrial control system having a processor operative to generate a second data packet for transmission, wherein the second data packet includes the identifier and the second data packet is transmitted concurrently with the first data packet; and
a third module of the industrial control system having a processor operative to:
receive one of the first data packet and the second data packet first,
receive one of the first data packet and the second data packet second,
extract data from one of the first and second data packet which was received first,
transmit the data extracted from one of the first and second data packet to a control circuit within the third module of the industrial control system,
identify one of the first and second data packet which was received second as redundant as a function of the identifier, and
disregard data from one of the first and second data packet identified as redundant.

2. The system of claim 1 further comprising:
a first connection path from the first module of the industrial control system to the third module of the industrial control system; and
a second connection path from the second module of the industrial control system to the third module of the industrial control system, wherein the second connection path is open for communication concurrent with the first connection path and the second connection path is different than the first connection path.

3. The system of claim 2 further comprising at least one intermediate module located in the first connection path between the first module of the industrial control system and the third module of the industrial control system, wherein the first connection path is defined on a per hop basis between the first module of the industrial control system, the at least one intermediate module, and the third module of the industrial control system.

4. The system of claim 2 wherein:
the first module of the industrial control system generates a first set of data to be transmitted,
the second module of the industrial control system generates a second set of data to be transmitted,
the first and second modules of the industrial control system agree on a set of data for transmission from one of the first and second sets of data.

5. The system of claim 4 wherein at least one of the first module of the industrial control system and the second module of the industrial control system assign a data sequence number to the set of data for transmission and wherein the third module of the industrial control system is further operative to identify one of the first and second data packet as redundant as a function of the identifier and of the data sequence number.

6. The system of claim 1, further comprising a fourth module of the industrial control system operative to:
receive one of the first data packet and the second data packet first,
receive one of the first data packet and the second data packet second,
extract data from one of the first and second data packets which was received first,
transmit the data extracted from one of the first and second data packet to a control circuit within the fourth module of the industrial control system,
identify one of the first and second data packet which was received second as redundant as a function of the identifier, and disregard the data from one of the first and second data packet identified as redundant.

7. The system of claim 6 wherein at least one of the third module of the industrial control system and the fourth module of the industrial control system compares the data extracted by the third module of the industrial control system to the data extracted by the fourth module of the industrial control system and the data extracted by each of the third and fourth modules is transmitted to the respective control circuit when the data extracted by the third module of the industrial control system matches the data extracted by the fourth module of the industrial control system.

8. A method of communicating data over a high availability industrial control network, comprising the steps of:
generating a first data packet for transmission with a first producer, wherein the first data packet includes an identifier defining a connection;
generating a second data packet for transmission with a second producer, wherein the second data packet includes the identifier;
transmitting both the first data packet from the first producer and the second data packet from the second producer to a first consumer concurrently;
receiving one of the first data packet and the second data packet first at the first consumer;
receiving one of the first data packet and the second data packet second at the first consumer;
extracting data from one of the first and second data packets which was received first with the first consumer;
identifying with the first consumer one of the first and second data packets which was received second as redundant as a function of the identifier; and
disregarding data from one of the first and second data packets identified as redundant with the first consumer.

9. The method of claim 8 wherein:
the first data packet is transferred via a first connection path from the first producer to the first consumer,
the second data packet is transferred via a second connection path from the second producer to the first consumer, and
the first connection path is different than the second connection path.

10. The method of claim 9 wherein the step of transmitting the first data packet from the first producer to the first consumer further includes transmitting the first data packet from the first producer to at least one intermediate module on a per hop basis.

11. The method of claim 10 wherein the step of transmitting the second data packet from the second producer to the first consumer further includes transmitting the second data packet from the second producer to at least one additional intermediate module on a per hop basis.

12. The method of claim 8 wherein the first data packet includes a first set of data generated by the first producer and the second data packet includes a second set of data generated by the second producer and the method further comprises the step of agreeing on a set of data for transmission by the first and second producer, wherein the set of data for transmission is selected from the first and second sets of data.

13. The method of claim 12 further comprising the step of assigning a data sequence number to the set of data for transmission wherein the first consumer further identifies one of the first and second data packets as redundant as a function of the data sequence number.

14. The method of claim 8 further comprising the steps of:
transmitting both the first data packet from the first producer and the second data packet from the second producer to a second consumer concurrently with transmitting the data packets to the first consumer;
receiving one of the first data packet and the second data packet first at the second consumer;
receiving one of the first data packet and the second data packet second at the second consumer;
extracting data from one of the first and second data packet which was received first with the second consumer;
identifying with the second consumer one of the first and second data packets which was received second as redundant as a function of the identifier; and
disregarding data from one of the first and second data packets identified as redundant with the second consumer.

15. The method of claim 14 further comprising the steps of:
comparing the data extracted by the first consumer to the data extracted by the second consumer, wherein the comparing is performed by at least one of the first consumer and the second consumer, and
transmitting the extracted data to a first control circuit in the first consumer and to a second control circuit in the second consumer when the data extracted by the first consumer matches the data extracted by the second consumer.

16. A method for opening connections in a high availability industrial control network, comprising the steps of:
generating a connection identifier with a pair of originators, wherein the pair of originators includes a first originator and a second originator;
storing the connection identifier in memory of each of the pair of originators;
generating a first concurrent connection open request in the first originator, wherein the first concurrent connection open request includes the connection identifier;
generating a second concurrent connection open request in the second originator, wherein the second concurrent connection open request includes the connection identifier;
transmitting the first concurrent connection open request from the first originator to a first target on a per hop basis to establish a first communication path;
transmitting the second concurrent connection open request from the second originator to the first target on a per hop basis to establish a second communication path;
receiving the first concurrent open request and the second concurrent open request serially at the first target;
marking a connection in the industrial control network as open with the first target responsive to receiving the first concurrent open request; and
identifying the second concurrent open request as part of the connection responsive to receiving the second concurrent open request.

17. The method of claim 16 wherein at least one intermediate module is located in the industrial control network between the first originator and the first target and wherein the first concurrent connection request passes through the at least one intermediate module, the method further comprising the step of including a per hop list of the at least one intermediate module and the first target in the first concurrent connection open request, wherein the step of transmitting the first concurrent connection open request further comprises the steps of:

transmitting the first concurrent connection open request in a first data packet from the originator to the at least one intermediate module; and transmitting the first concurrent connection open request in a second data packet from the at least one intermediate module to the first target.

18. The method of claim 17 further comprising the step of opening the connection in the at least one intermediate module by storing per hop information from the per hop list in memory of the intermediate module for each downstream hop from the intermediate module, storing the connection identifier in memory of the intermediate module, and marking an upstream per hop connection from the intermediate module to one of another intermediate module or the originator as open.

19. The method of claim 16 further comprising the steps of:

transmitting the first concurrent connection open request from the first originator to a second target on a per hop basis to establish a third communication path;

transmitting the second concurrent connection open request from the second originator to the second target on a per hop basis to establish a fourth communication path;

receiving the first concurrent open request and the second concurrent open request serially at the second target;

marking the connection as open with the second target responsive to receiving the first concurrent open request; and identifying the second concurrent open request as part of the connection responsive to receiving the second concurrent open request.

20. The method of claim 19 wherein the connection remains open as long as at least one of the first communication path, second communication path, third communication path, and fourth communication paths remains open.

* * * * *